(12) United States Patent
Hakola et al.

(10) Patent No.: US 9,144,098 B2
(45) Date of Patent: Sep. 22, 2015

(54) REAL-TIME GAMING AND OTHER APPLICATIONS SUPPORT FOR D2D COMMUNICATIONS

(75) Inventors: Sami-Jukka Hakola, Kempele (FI); Timo K. Koskela, Oulu (FI); Vinh V. Phan, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 1162 days.

(21) Appl. No.: 12/931,973

(22) Filed: Feb. 14, 2011

(65) Prior Publication Data
US 2012/0207100 A1  Aug. 16, 2012

(51) Int. Cl.
*H04W 72/04* (2009.01)
*H04W 76/02* (2009.01)
*H04L 5/00* (2006.01)

(52) U.S. Cl.
CPC ........... *H04W 76/023* (2013.01); *H04L 5/0053* (2013.01)

(58) Field of Classification Search
USPC .......................................... 370/329, 322, 341
See application file for complete search history.

(56) References Cited

U.S. PATENT DOCUMENTS

| 7,733,908 | B1 | 6/2010 | Evans | 370/469 |
| 2002/0009993 | A1* | 1/2002 | Dastrup et al. | 455/431 |
| 2004/0162061 | A1* | 8/2004 | Abrol et al. | 455/414.1 |
| 2007/0189205 | A1* | 8/2007 | Terry et al. | 370/328 |
| 2008/0123582 | A1* | 5/2008 | Maekawa | 370/315 |
| 2009/0225711 | A1* | 9/2009 | Sammour et al. | 370/329 |
| 2010/0040028 | A1 | 2/2010 | Maheshwari et al. | |
| 2010/0135251 | A1 | 6/2010 | Sambhwani et al. | |

FOREIGN PATENT DOCUMENTS

| WO | WO 2010/049801 A1 | 5/2010 |
| WO | WO 2010049801 A1 * | 5/2010 |
| WO | WO 2010/082084 A1 | 7/2010 |

OTHER PUBLICATIONS

3GPP TS 36.300 V8.11.0 (Dec. 2009) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), (148 pages).

(Continued)

*Primary Examiner* — Dang Ton
*Assistant Examiner* — Pamit Kaur
(74) *Attorney, Agent, or Firm* — Harrington & Smith

(57) ABSTRACT

An apparatus is disclosed that performs operations including determining whether an application message meets a predetermined set of criteria. If the application message meets the set, the application message is transmitted via a first communication layer pathway between the apparatus and one or more other apparatuses participating in a device-to-device communication with the apparatus. If the application message does not meet the set, the application message is transmitted via a second communication layer pathway between the apparatus and the other apparatus. The first and second communication layer pathways are different. The first pathway may be an L1 physical control channel while the second pathway may be an L1 physical data channel. The first pathway may be a first L2 logical channel while the second pathway may be a second L2 logical channel. Methods and program products are also disclosed.

19 Claims, 16 Drawing Sheets

(56) References Cited

OTHER PUBLICATIONS

3GPP TS 36.300 V9.3.0 (Mar. 2010) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9), (166 pages).

3GPP TR 36.913 V9.0.0 (Dec. 2009) 3rd Generation Partnership Project; Technical Specification Group Radio Access Network; Requirements for further advancements for Evolved Universal Terrestrial Radio Access (E-UTRA) (LTE-Advanced) (Release 9), (15 pages).

3GPP TR 36.912 V9.2.0 (Mar. 2010) 3rd Generation Partnership Project; Technical Specification Group Radio Access Network; Feasibility study for Further Advancements for E-UTRA (LTE-Advanced) (Release 9), (61 pages).

Mathialagan, et al., "Cross-Layer Optimization Using MIMO System for Wireless Networks", 2009 International Conference on Signal Processing Systems, IEEE Computer Society, (2009), (pp. 651-655).

Pantel, et al., "On the Impact of Delay on Real-Time Multiplayer Games", (2002), (pp. 23-29).

Jarvinen, et al., "QoS-Aware Real-Time Video Encoding, How to Improve the User Experience of a Gaming-on-Demand Service", (2005), (pp. 994-997).

Evans, et al., "Location Aware Mobile Networking", Stevens Institute of Technology, Wireless Network Security Center, (6 pages).

"Turbo Sliders", http://en.wikipedia.org/wiki/Turbo_Sliders , (Oct. 2010), (pp. 1-3).

Ket, et al., "Cross Layer Communication for Wireless Networks", International Conference on Advances in Computing, Communication and Control, (Jan. 2009), (pp. 629-632).

Ericsson, "Vision 2020, 50 Billion Connected Devices", (Dec. 2009), (9 pages).

Qualcomm, "Future of Wireless? The Proximate Internet", Rajiv Laroia, (Jan. 7, 2010), (38 pages).

\* cited by examiner

REAL-TIME GAMING AND OTHER APPLICATIONS SUPPORT FOR D2D COMMUNICATIONS

TECHNICAL FIELD

This invention relates generally to wireless communications and, more specifically, relates to device-to-device communications in a wireless network.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
ACK acknowledgment
BS base station
C-PDU control-protocol data unit
D2D device-to-device
DL downlink (eNB towards UE)
E2E end-to-end
eNB E-UTRAN Node B (evolved Node B)
EPC evolved packet core
E-UTRAN evolved UTRAN (LTE)
FDD frequency division duplex
FDM frequency division multiplex
HARQ hybrid autonomous retransmission request
IMTA international mobile telecommunications association
ITU-R international telecommunication union-radiocommunication sector
LTE long term evolution of UTRAN (E-UTRAN)
LTE-A LTE advanced
MAC medium access control (part of layer 2, L2)
MM/MME mobility management/mobility management entity
NACK negative acknowledgment
NodeB base station
OFDM orthogonal frequency division multiplex
O&M operations and maintenance
PCCH physical control channel
PDCCH physical downlink control channel
PDCP packet data convergence protocol
PHY physical (layer 1, L1)
PUCCH physical uplink control channel
Rel release
RL radio link
RLC radio link control
RRC radio resource control
RRM radio resource management
SGW serving gateway
SC-FDMA single carrier, frequency division multiple access
TCP transmission control protocol
TDD time division duplex
TDM time division multiplex
TPC transmission power control
UDP user datagram protocol
UE user equipment, such as a mobile station, mobile node or mobile terminal
UL uplink (UE towards eNB)
UPE user plane entity
UTRAN universal terrestrial radio access network One modern communication system is known as evolved UTRAN (E-UTRAN, also referred to as UTRAN-LTE or as E-UTRA). In this system, the DL access technique is OFDMA, and the UL access technique is SC-FDMA.

One specification of interest is 3GPP TS 36.300, V8.11.0 (2009-12), 3rd Generation Partnership Project; Technical Specification Group Radio Access Network; Evolved Universal Terrestrial Radio Access (E-UTRA) and Evolved Universal Terrestrial Access Network (EUTRAN); Overall description; Stage 2 (Release 8), incorporated by reference herein in its entirety. This system may be referred to for convenience as LTE Rel-8. In general, the set of specifications given generally as 3GPP TS 36.xyz (e.g., 36.211, 36.311, 36.312, etc.) may be seen as describing the Release 8 LTE system. More recently, Release 9 versions of at least some of these specifications have been published including 3GPP TS 36.300, V9.3.0 (2010-03).

FIG. 1 of this Application reproduces a figure taken from a reference, namely, FIG. 4-1 of 3GPP TS 36.300 V8.11.0, and shows the overall architecture of the EUTRAN system (Rel-8). The E-UTRAN system includes eNBs, providing the E-UTRAN user plane (PDCP/RLC/MAC/PHY) and control plane (RRC) protocol terminations towards the UEs. The eNBs are interconnected with each other by means of an X2 interface. The eNBs are also connected by means of an S1 interface to an EPC, more specifically to a MME by means of a S1 MME interface and to a S-GW by means of a S1 interface (MME/S-GW 4). The S1 interface supports a many-to-many relationship between MMEs/S-GWs/UPEs and eNBs.

Of particular interest herein are the further releases of 3GPP LTE (e.g., LTE Rel-10 and beyond Rel-10) targeted towards future IMTA systems, referred to herein for convenience simply as LTE-Advanced (LTE-A). Reference in this regard may be made to 3GPP TR 36.913, V9.0.0 (2009-12), 3rd Generation Partnership Project; Technical Specification Group Radio Access Network; Requirements for Further Advancements for E-UTRA (LTE-Advanced) (Release 9). Reference can also be made to 3GPP TR 36.912 V9.2.0 (March 2010) Technical Report 3rd Generation Partnership Project; Technical Specification Group Radio Access Network; Feasibility study for Further Advancements for E-UTRA (LTE-Advanced) (Release 9).

A goal of LTE-A is to provide significantly enhanced services by means of higher data rates and lower latency with reduced cost. LTE-A is directed toward extending and optimizing the 3GPP LTE Rel-8 radio access technologies to provide higher data rates at lower cost. LTE-A will be a more optimized radio system fulfilling the ITU-R requirements for IMT-Advanced while keeping the backward compatibility with LTE Rel-8.

Integration of new network topologies into cellular networks such as those described above is gaining more attention and interest, both in the telecommunications industry and in telecommunications research. Good examples are, e.g., a current study item of heterogeneous networks in LTE/LTE-A of 3GPP. Such heterogeneous networks include a deployment of macros, micros, picos, femtos and relays in the same spectrum. One step further is to enable heterogeneous local communication directly among devices and machines under supervision of the network. Heterogeneous in a local domain could include the following:

Network controlled device-to-device (D2D) communication including communication in clusters of devices;

(Semi-)Autonomous D2D communication in a cellular network;

A grid/group of local machines communicating with each other while performing certain tasks in co-operative way;

An advanced cellular device acting as a gateway for a number of low-capability devices or machines to allow these to access a cellular network; and Co-operative downloading or multicasting within a cluster of devices.

Such local communication schemes may play a remarkable role in the future. For instance, there are estimates that there will be 50 billion devices with wide varieties of capabilities connected to networks by 2020. D2D communication, in particular, is attracting significant interest for at least the following reasons:

D2D is seen as a potential technique for improve local area coverage;

D2D is seen as a potential solution to improve resource efficiency;

D2D can aid in conserving both UE and eNB transmit (Tx) power;

D2D can aid in reducing the load on the cellular network; and

D2D has the potential to provide new types of services for end users.

Nonetheless, there are certain situations in which D2D communications could be improved.

BRIEF SUMMARY

In an exemplary embodiment, an apparatus is disclosed that includes a transceiver for bidirectional wireless communications, one or more processors and one or more memories including computer program code. The one or more memories and the computer program code are configured to, with the one or more processors and in response to execution of the computer program code, cause the apparatus to perform at least the following: determining whether an application message from an application meets a predetermined set of criteria; in response to the application message meeting the predetermined set of criteria, transmitting the application message via a first communication layer pathway from the application to an L1 physical control channel used to communicate in a wireless device-to-device communication with at least one other apparatus; and in response to the application message not meeting the predetermined set of criteria, transmitting the application message via a second communication layer pathway from the application to an L1 physical data channel used to communicate in the wireless device-to-device communication with the at least one other apparatus.

In another exemplary embodiment, an apparatus is disclosed that includes a transceiver for bidirectional wireless communications, one or more processors and one or more memories including computer program code. The one or more memories and the computer program code are configured to, with the one or more processors and in response to execution of the computer program code, cause the apparatus to perform at least the following: determining whether an application message from an application meets a predetermined set of criteria; in response to the application message meeting the predetermined set of criteria, transmitting the application message via a first communication layer pathway from the application to a first L2 logical channel used to communicate in a wireless device-to-device communication with at least one other apparatus; and in response to the application message not meeting the predetermined set of criteria, transmitting the application message via a second communication layer pathway from the application to a second L2 logical channel used to communicate in the wireless device-to-device communication with the at least one other apparatus.

In yet an additional embodiment, an apparatus is disclosed that includes a transceiver for bidirectional wireless communications, one or more processors and one or more memories including computer program code. The one or more memories and the computer program code are configured to, with the one or more processors and in response to execution of the computer program code, cause the apparatus to perform at least the following: for a number of wireless communication devices to communicate in a device-to-device communication, determining an L1 physical control channel to be used by the number of wireless communication devices to communicate application messages meeting a predetermined set of criteria and determining an L1 physical data channel to be used by the number of wireless communication devices to communicate application messages not meeting the predetermined set of criteria; and signaling, using the transceiver, indications of the determined L1 physical control channel and L1 physical data channel to the number of wireless communication devices.

In a further embodiment, an apparatus is disclosed that includes a transceiver for bidirectional wireless communications, one or more processors and one or more memories including computer program code. The one or more memories and the computer program code are configured to, with the one or more processors and in response to execution of the computer program code, cause the apparatus to perform at least the following: for a number of wireless communication devices to communicate in a device-to-device communication, determining a first L2 logical channel used by the number of wireless communication devices to communicate application messages meeting a predetermined set of criteria and determining a second L2 logical channel used by the number of wireless communication devices to communicate application messages not meeting the predetermined set of criteria; and signaling, using the transceiver, indications of the determined first and second L2 logical channels to the number of wireless communication devices.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein.

DETAILED DESCRIPTION OF THE DRAWINGS

Figure 1:
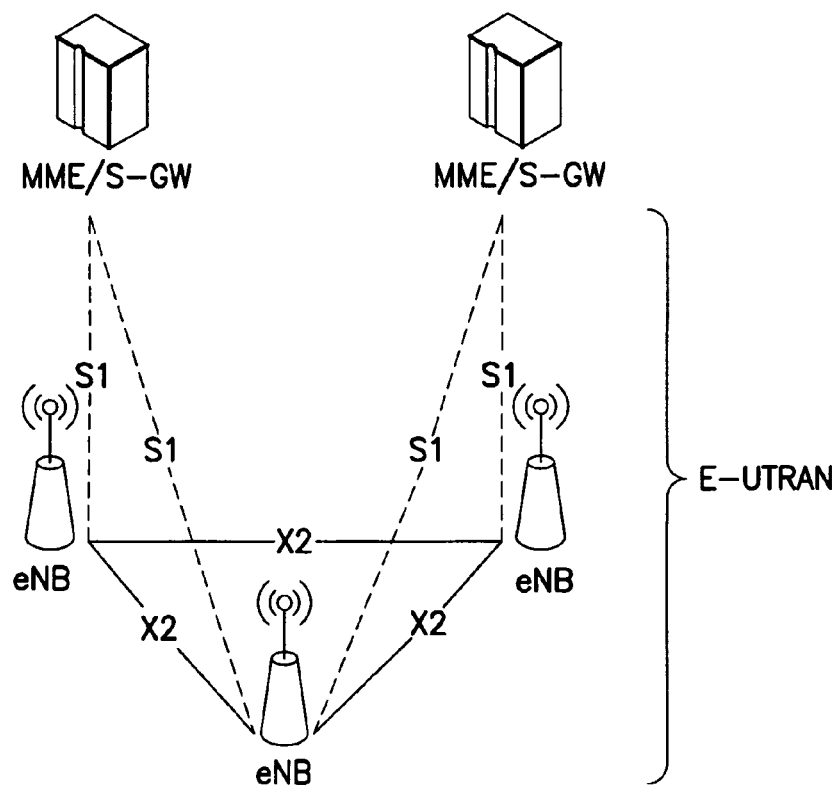
FIG. 1 of this Application reproduces a figure taken from a reference, namely, FIG. 4-1 of 3GPP TS 36.300, and shows the overall architecture of the EUTRAN system.

As described above, D2D communications are becoming increasingly important. D2D communications are, in the context of the instant invention, wireless communications between two wireless communications devices using radio resources of a radio network, where the wireless communications at least on a user-plane pass directly between the two wireless communications devices (i.e., and do not pass through a base station). In particular, in a cellular-controlled D2D communication, two wireless communications devices use cellular radio resources (e.g., radio links in a licensed cellular spectrum or in an unlicensed spectrum under supervision or control of a serving cellular system) in a wireless communication, where the wireless communication at least on the user plane does not pass through a base station.

Regarding applications that could potentially be used in D2D communications, interactive real-time multimedia applications such as multi-player video gaming are one set of possible applications. These applications have rather demanding QoS requirements. These requirements are not only in terms of small latency in bidirectional communications between involved parties including player devices but also in terms of bandwidth in downstreaming videos associated with the game. This is not just a problem seen in synchronization of three-dimensional (3D) models of different users in a networked game, but the problem is also seen in advanced video games: high latency can cause the users to lose control of the game and the game becomes unplayable.

The most demanding games in term of latency are also typically the most popular ones. These include racing games and first-person shooters. For instance, a relatively simple car racing game allows for up to 20 players racing cars and allows for competing over networks such as the Internet. In this game, a personal computer (PC) of one player can be a host, which acts as the central point or server. The application is actually run on PCs of the individual players and the server may collect gaming commands from the players and send short gaming updates, e.g., position vectors to the players through the Internet. Making this kind of game available over direct D2D communications may be a potential application and service. In this scenario, one device may be a host and all other devises are players. Important to such games is that the players need to transmit user game commands (e.g., up-down-left-right-space keystrokes) to the host and then the host needs to distribute server game updates among the players. Therefore, a reliable and effective method to realize that over D2D communications is highly desirable.

Because end-to-end connection over a direct D2D communication includes just a single radio link typically, joint channel-aware and application-aware adaptation across all the layers of protocol stacks on the direct D2D connection is practical. Exemplary embodiments of the invention consider cross-layer optimization possibilities and techniques are proposed herein for the aforementioned need of distributing user game commands among players over D2D communications(s).

Figure 2:
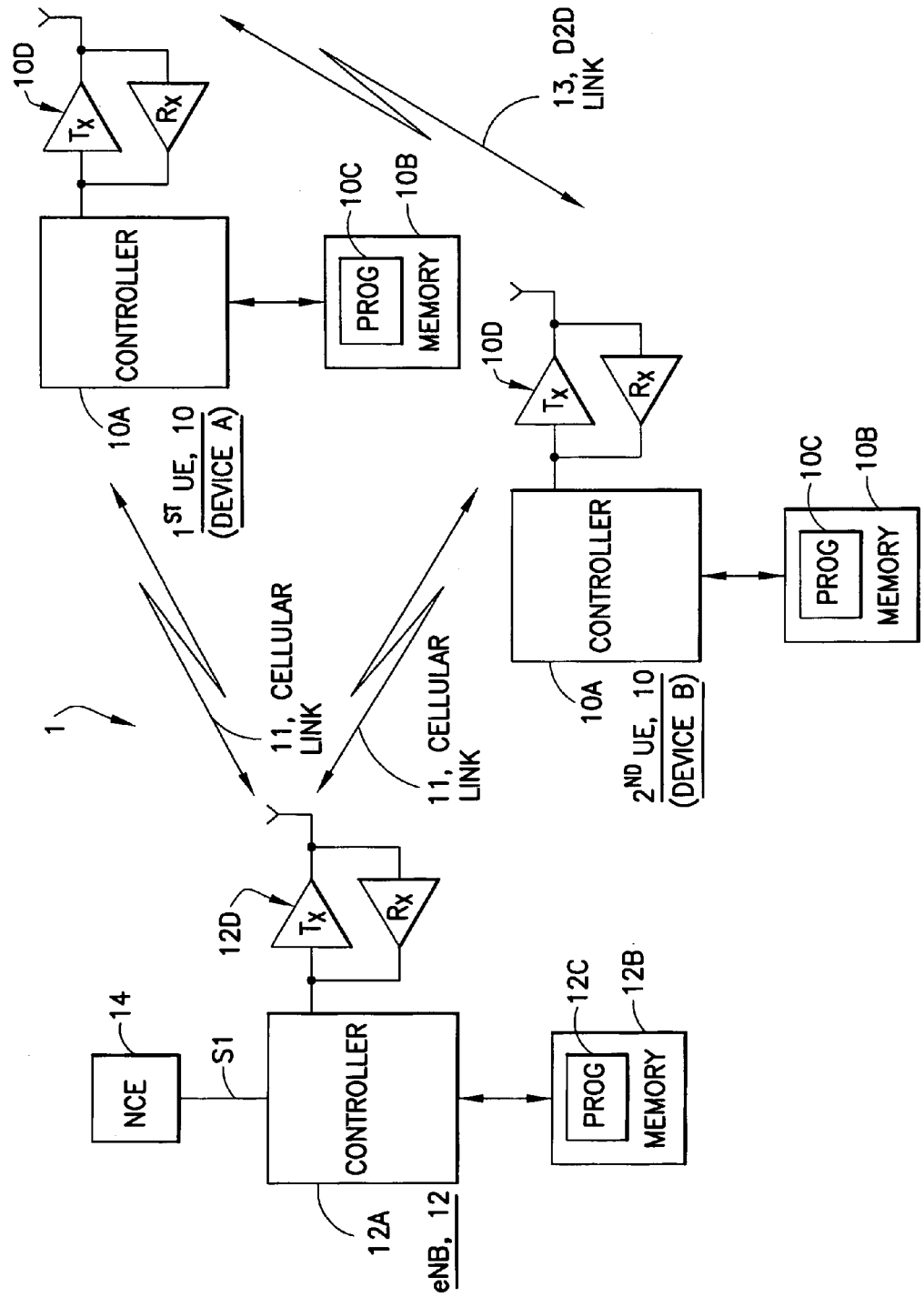
FIG. 2 shows a simplified block diagram of various electronic devices that are suitable for use in practicing the exemplary embodiments of this invention.

Before describing in detail the exemplary embodiments of this invention, reference is made to FIG. 2 for illustrating a simplified block diagram of various electronic devices and apparatus that are suitable for use in practicing the exemplary embodiments of this invention. In FIG. 2 a wireless network 1, which may be a cellular wireless network, is adapted for communication over a wireless, e.g., cellular, link 11 with an apparatus, such as a mobile communication device which may be referred to as a first UE 10, via a network access node, such as a Node B (base station), and more specifically an eNB 12. The cellular network 1 may include a network control element (NCE) 14 that may include the MME/SGW functionality shown in FIG. 1, and which can provide connectivity with a further network, such as a telephone network and/or a data communications network (e.g., the internet). The UE 10 includes a controller 10A, such as at least one computer or a data processor, at least one non-transitory computer-readable memory medium embodied as a memory 10B that stores a program of computer instructions (PROG) 10C, and at least one suitable radio frequency (RF) transmitter and receiver pair (transceiver) 10D for bidirectional wireless communications with the eNB 12 via one or more antennas. The eNB 12 also includes a controller 12A, such as at least one computer or a data processor, at least one computer-readable memory medium embodied as a memory 12B that stores a program of computer instructions (PROG) 12C, and at least one suitable RF transceiver 12D for communication with the UE 10 via one or more antennas (typically several when multiple input/multiple output (MIMO) operation is in use). The eNB 12 can be coupled via a data/control path to the NCE 14, where the path may be implemented as the S1 interface shown in FIG. 1. The eNB 12 may also be coupled to another eNB via the X2 interface shown in FIG. 1.

FIG. 2 shows the presence of a second UE 10 which may or may not be identically constructed as the first UE 10 (e.g., they may or may not be made by the same manufacturer). The transceivers 10D of the first and second UEs 10 are capable of wireless, direct communication via a D2D link 13. The first and second UEs 10 may thus be considered for the purposes of this description as being "D2D devices", without a loss of generality. When in the D2D connection mode, typically one of the D2D devices can be considered to be a master D2D node, and the other(s) a slave D2D device. When in the D2D mode, the first and second UEs 10, as well as other UEs, may form a D2D cluster. In this case, one of the UEs 10 can be assigned the functionality of (e.g., the role of) the cluster head device. When operating in the D2D mode, communication with the cellular system 1 via the eNB 12 can be accomplished at least by the D2D cluster head device.

It can be noted that in some use cases and deployments at least one of the D2D devices can be a fixed (non-mobile) device. For example, one of the D2D devices could function as a media content server capable of D2D communication with a population of mobile D2D devices (UEs 10) in the vicinity of the fixed D2D device.

At least the program 10C is assumed to include program instructions that, when executed by the associated controller 10A, enable the device to operate in accordance with the exemplary embodiments of this invention, as will be discussed below in greater detail. That is, the exemplary embodiments of this invention may be implemented at least in part by computer software executable by the controller 10A of the UE 10, or by hardware (i.e., that is enabled to perform one or more of the operations herein), or by a combination of software and hardware (and firmware). It is noted that computer software stored in PROG 10C must be executed by the controller 10A in order for the controller 10A and its corresponding UE 10 to perform operations defined by the computer software.

In general, the various embodiments of the UEs 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer-readable memories 10B and 12B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The controllers 10A and 12A may be of any type suitable to the local technical environment, and may include one or more of general purpose computers, special purpose computers, microprocessors, digital signal processors (DSPs) and processors based on multi-core processor architectures, as non-limiting examples.

Aspects of this invention consider multi-player gaming applications over, e.g., the aforementioned LTE-A cellular controlled direct D2D communications and propose techniques for transmitting and distributing particular kinds of application messages, namely user game commands (such as up-down-left-right-space keystrokes) and server game updates (such as position vectors), among involved devices over D2D radio interface(s) with cross-layer optimization. A number of alternatives are proposed below, but before proceeding with a description of the alternatives, it is helpful to provide additional description of likely scenarios for gaming and other applications using D2D communications.

Figure 3:
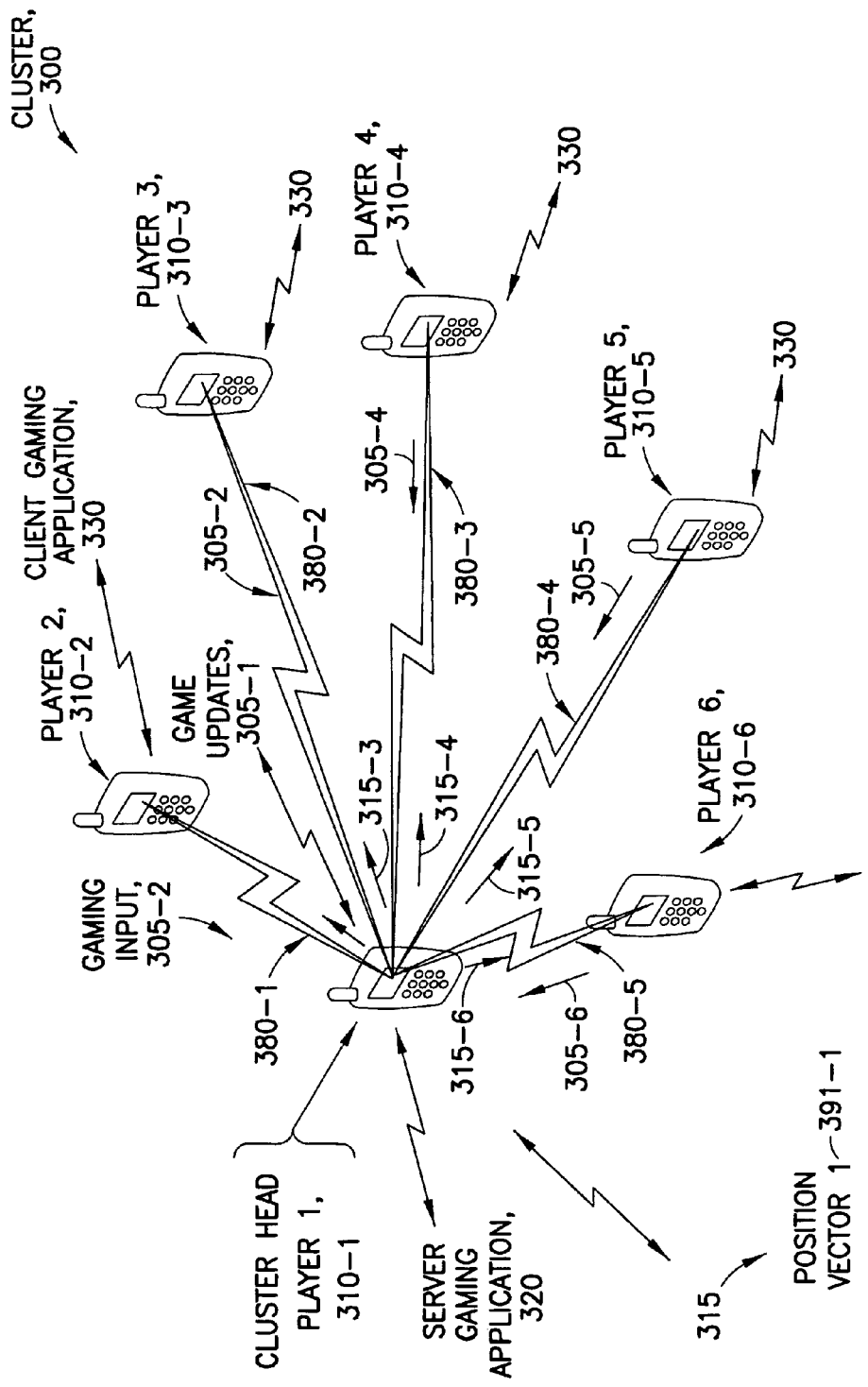
FIG. 3 is an example of a cluster used to illustrate supporting multi-player gaming over D2D communications.

Turning to FIG. 3, an example is shown of a cluster 300 used to illustrate supporting multi-player gaming over D2D communications (e.g., D2D communications over links 380-1 through 380-5). The cluster 300 includes a UE 310-1 acting as cluster head. In this example, the UE for the player (Player 1) who initiates the game is selected as the cluster head, but other scenarios are possible. There are five other players (Players 2, 3, 4, 5, and 6), who have been invited to participate in the game by the first player. Each of the invited players has a corresponding UE 310. The cluster head UE 310-1 in this example executes a server gaming application 320, while each additional UE 310-2 through 310-6 for the invited players executes a client gaming application 330. In this example, the server gaming application 320 is assumed to include a client gaming application, so that Player 1 may also participate in the game. Under control of the client gaming application 330, each of the UEs 310-2 through 310-6 for the invited players sends corresponding gaming input 305-2 through 305-6, such as up, down, left, right, and space keystrokes, to the server gaming application 320 in the cluster head UE 310-1. The server gaming application 320 then sends game updates 315-2 through 315-6 to a corresponding UE 310-2 through 310-6. The game updates 315 include, e.g., N position vectors 391-1 through 391-N, which typically include position vectors for each of the Players 1-6. In this example, the server gaming application 320 and client gaming application 330 each produces its own video using the game updates 315, so no video is transferred via the D2D communications over D2D links 380.

As can be imagined based on FIG. 3, enabling popular multi-player games such as car racing or first person shooting over D2D communications is rather desirable, but challenging due to demanding quality of service (QoS) requirements:
1) Rather small latency in bidirectional communications between devices of the players; and
2) In case the hosting device (the cluster head in the example of FIG. 3) needs to share the game online then bandwidth for video in, e.g., a down-streaming game, is high.

Important to such games is fast real-time distribution of user gaming input 305 (e.g., up-down-left-right-space and perhaps UE position information, such as tilt) among the players, and also fast reception and implementation of game updates 315. Aspects of the instant invention aim to meet these criteria.

Figure 4:
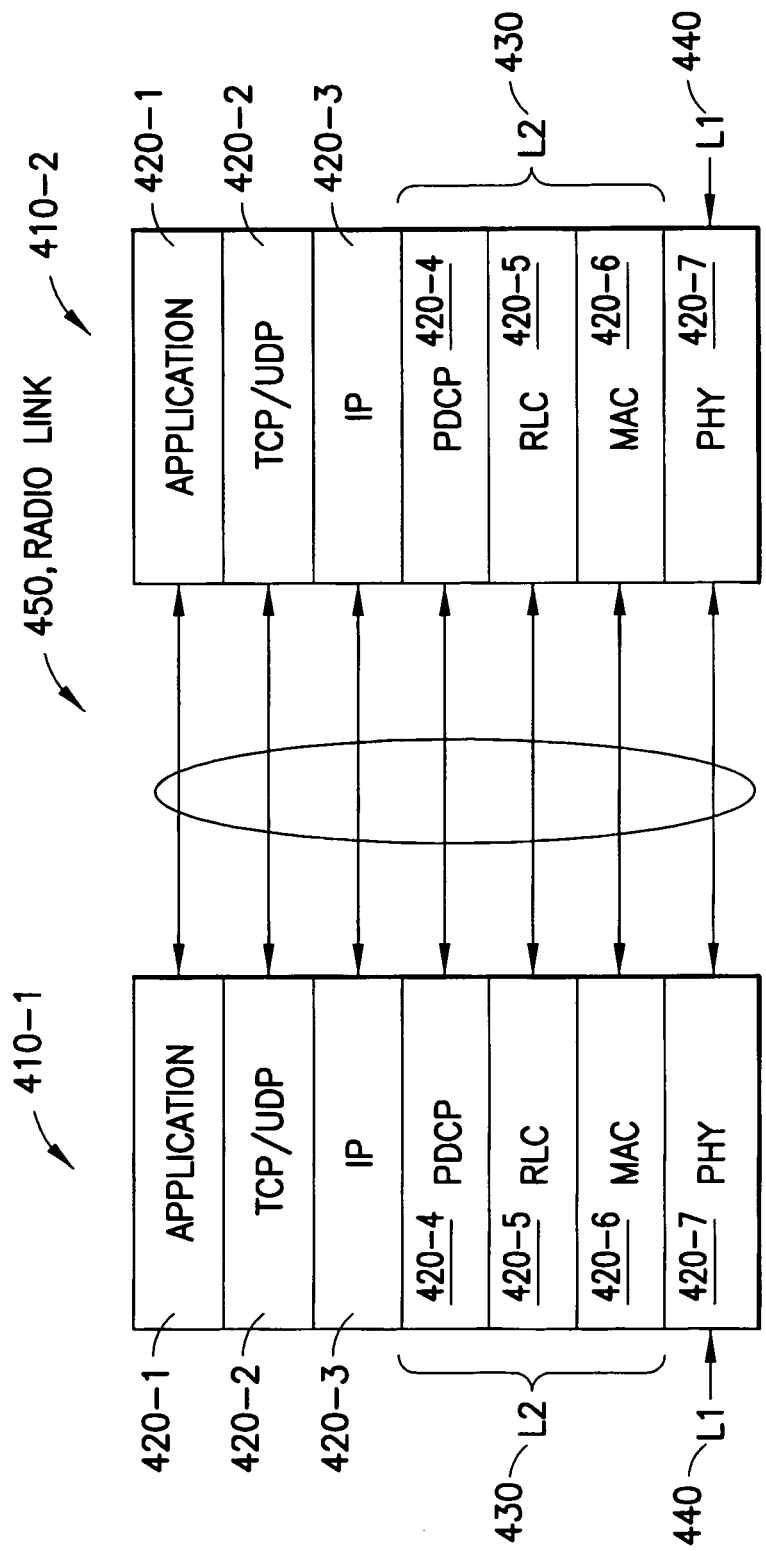
FIG. 4 shows an example of an E2E connection over a direct D2D connection that consists of a single RL.

Turning to FIG. 4, this figure shows an example of an end-to-end (E2E) connection over a direct D2D connection that consists of a single radio link (RL) 450. Over the single RL 450 communicate two UEs 410-1, 410-2. Each of the UEs has a number of communication layers 420-1 (application layer), 420-2 (TCP/UDP layer), 420-3 (IP layer), 420-4 (PDCP layer), 420-5 (RLC layer), 420-6 (MAC layer) and 420-7 (PHY layer). The L2 layer 430 includes the PDCP layer 420-4, RLC layer 420-5, and the MAC layer 420-6.

It is expected that an E2E connection over a direct D2D may consist of a single RL 450, as shown in FIG. 4. FIG. 4 additionally shows that joint channel- and application-aware adaptation across all the layers of the protocol stacks on D2D is practical.

Knowing that such adaptation is practical, certain techniques can be used that use the adaptation to enable popular multi-player games over D2D communications while maintaining the demanded QoS requirements.

For instance, in broad terms, selected application messages from an application such as a gaming application 330 of FIG. 3 are preferentially handled and accelerated through the layers 420 relative to other application messages. Such handling and acceleration involves transmitting (e.g., FIG. 5) and receiving (e.g., FIG. 6) the selected application messages via first (e.g., accelerated) pathways between UEs or between a UE and an eNB. The other application messages are transmitted and received via second (e.g., normal) pathways between UEs or between a UE and an eNB.

Figure 5:
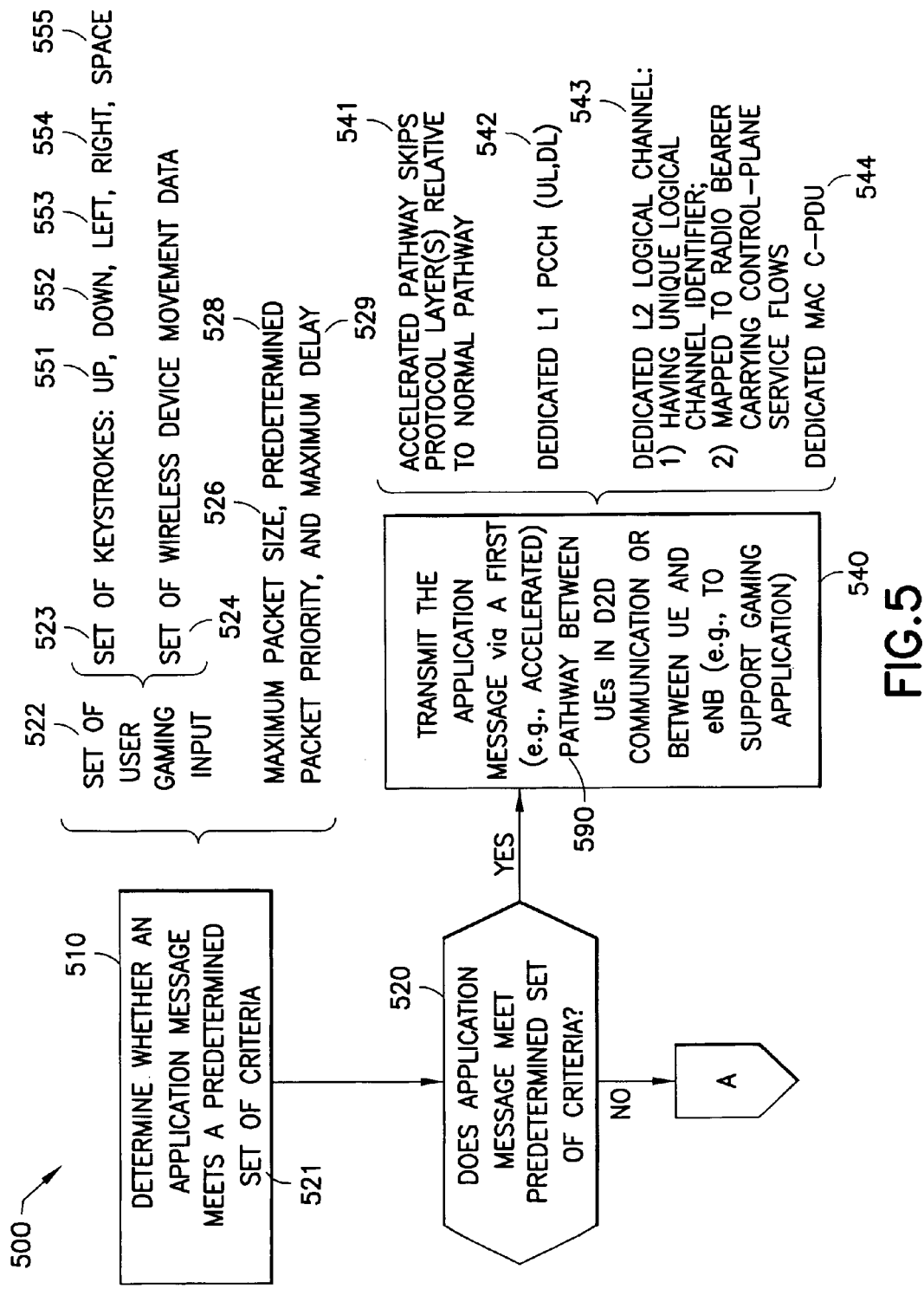
FIG. 5 is a block diagram of an exemplary flow chart used by a wireless communications device to transmit information for real-time gaming and other applications to support D2D communications.
Figure 5:
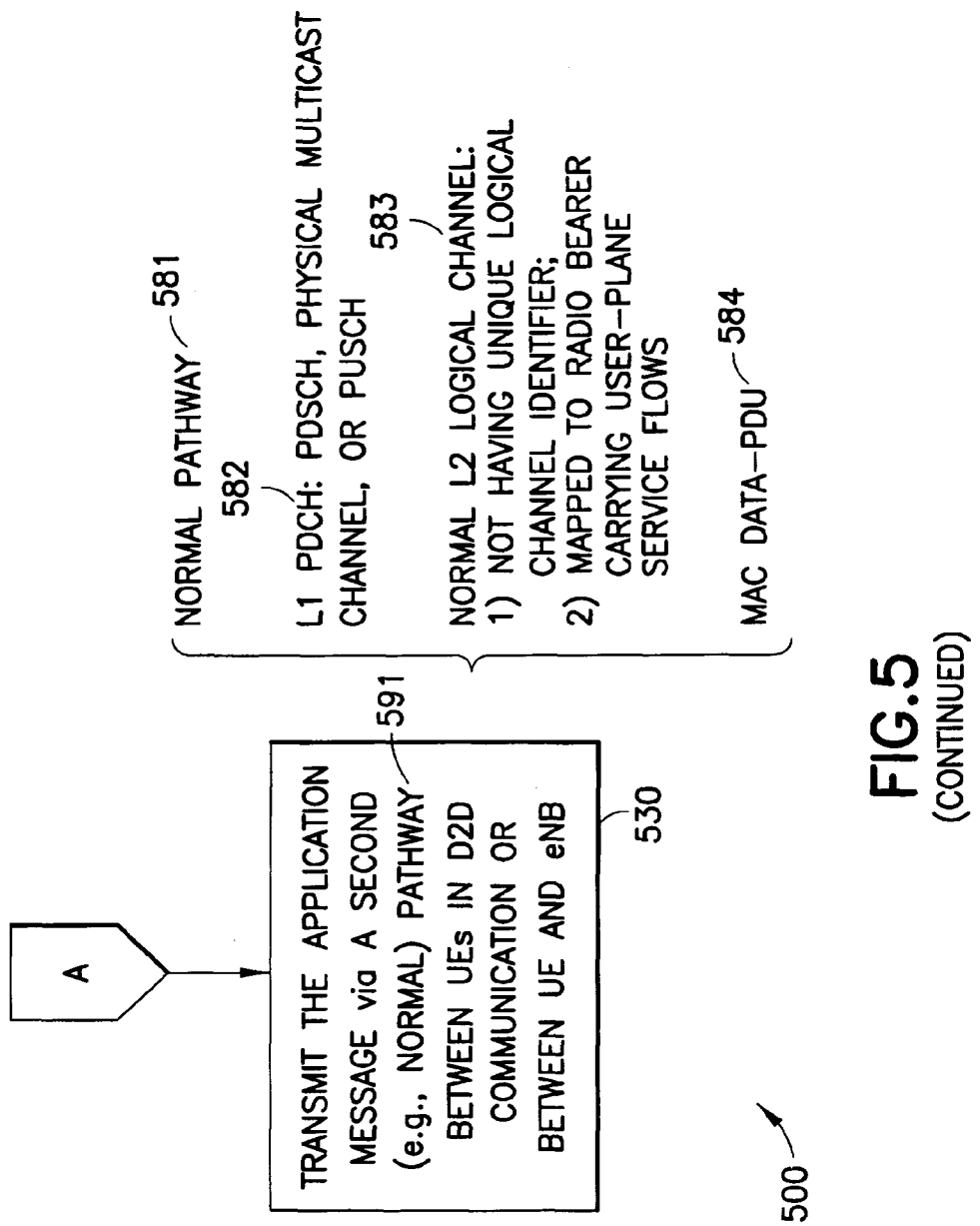

Turning to FIG. 5, a block diagram is shown of an exemplary flow chart 500 used by a wireless communications device to transmit information for real-time gaming and other applications to support D2D communications. Blocks in the block diagram may be performed, e.g., by a controller 10A executing program 10C in the UE 10 of FIG. 2, hardware elements in the UE such as a semiconductor circuit configured to perform the blocks, or some combination of these.

In block 510, it is determined whether an application message meets a predetermined set 521 of criteria. The predetermined set 521 of criteria is typically related to a set 522 gaming input, such as a set 523 of keystrokes (e.g., up 551, down 552, left 553, right 554, and space 555), or a set 524 of wireless communications device movement data, e.g., generated by accelerometers or the like. It is noted that the set 523 of keystrokes is a subset of all possible keystrokes.

However, the invention may also be extended to any kinds of delay-sensitive, high-priority and very short application messages in D2D communications may be transmitted in such the ways proposed herein. In this regard, filtering criteria may be introduced and formats (e.g., as some fixed constraints of the criteria) may be configured for the involved devices and the session to enhance operation. Exemplary filtering criteria may be implemented as the predetermined set 521 of criteria and include, in an exemplary embodiment, maximum packet size 526, predetermined packet priority 528, and a maximum delay 529. That is, an application message, in this example, needs to meet each of the maximum packet size 526, predetermined packet priority 528, and a maximum delay 529 in order to meet the predetermined set 521 of criteria. It is noted that the predetermined set 521 of criteria could be a single criterion (e.g., maximum packet size 526). For example, the criterion could be predetermined fixed small packet size(s) for those kind(s) of application messages of interest. Thus, "maximum" packet size 526 would only be a predetermined packet size, and the predetermined packet priority 528 and the maximum delay 529 would not be used. As yet another example, there could be explicit registration of an application (e.g., in block 510) and this registration would be used to automatically determine that messages from the application meet the predetermined set 521 of criteria.

If the application message is determined to meet the predetermined set 521 of criteria (block 520=Yes), the application message is transmitted via a first (e.g., accelerated) pathway 590 between UEs in D2D communication or between UE and eNB (e.g., to support a gaming application 320/330). This occurs in block 540. The pathway 590 can include an accelerated pathway 541 that "skips" protocol layer(s) 420 (as described in more detail below) relative to the number of protocol layers 420 taken by the other, non-selected application messages. The pathway 590 can include, as further described below, a dedicated L1 physical control channel (PCCH) 542, a dedicated L2 logical channel 543, or a dedicated MAC control protocol data unit (C-PDU) 544, as examples. The dedicated L1 physical control channel 542 may include uplink (UL) or downlink (DL) channels. The dedicated L2 logical channel 593 may include the following as non-limiting examples: 1) an L2 logical channel having unique logical channel identifier for all of the mobile communication devices to participate in the D2D communication; 2) an L2 logical channel mapped to a radio bearer carrying control-plane service flows.

If the application message is not determined to meet the predetermined set 521 of criteria (block 520=No), the application message is transmitted via a second (e.g., normal) pathway 591 between UEs in D2D communication or between UE and eNB. This occurs in block 530. The "normal" pathway 591 is that lower communication layers 420-2 through 420-7, particularly the radio-access L1+L2 or PHY/MAC/RLC/PDCP as in 3GPP LTE, are not at all aware of and have no direct communications with the application layer (420-1). The application data are most often packed into, e.g., UDP/IP packets which are separated as logical service data flows (SDF) (based on information in UDP/IP packet header: each SDF consists of packets which have the same, e.g., source IP address, source port address, destination IP address, destination port address, some other information such as 5-bit DSCP (differentiated services code point) or flow label). Then, service data flows (SDFs) are passed down to PDCP which are then operated on (e.g., mapped, multiplexed, compressed, ciphered) on so call radio-bearer (RB) services specific to the radio access network (LTE E-UTRAN for instance) which are further passed down to RLC and then MAC. Each RB is actually mapped on a logical channel, which has a unique logical channel identification (ID) for, e.g., many of the same users. MAC is responsible for scheduling and transmitting logical channels on specified L1 transport and physical channels (e.g., a shared transport channel mapped on a shared physical channel as in LTE E-UTRAN).

In this normal pathway 591, application data cannot be sent directly on a physical control channel or in form of a MAC C-PDU or even in a special logical channel carrying only certain selected packets of application data.

Also shown in reference to block 530 are the normal pathways 581-584, each of which corresponds to an accelerated pathway 541-544. That is, the accelerated pathway 541 skips protocol layer(s) while the normal pathway 581 does not. The dedicated L1 PCCH 542 is an accelerated pathway, while the corresponding normal pathway is a physical data channel (PDCH) 582, including (as examples) the physical downlink shared channel (PDSCH), physical multicast channel, or physical uplink shared channel (PUSCH). The normal L2 logical channel 583 corresponds to the dedicated L2 logical channel 543, and includes 1) an L2 logical channel that does not have a unique logical channel identifier and 2) an L2 logical channel that is mapped to a radio bearer carrying user-plane service flows. The MAC data-PDU 584 corresponds to the dedicated MAC C-PDU 544.

It is noted that blocks 510 and 520 may be combined into a single block. However, for ease of exposition, these blocks are shown separately in FIG. 5.

It is further noted that block 510 may consider whether a game update is to be transmitted and may therefore consider that a game update meets the predetermined set 521 of criteria. Transmission of the game update would then be preferentially accelerated relative to transmission of the other application messages. This is described in further detail below.

Figure 6:
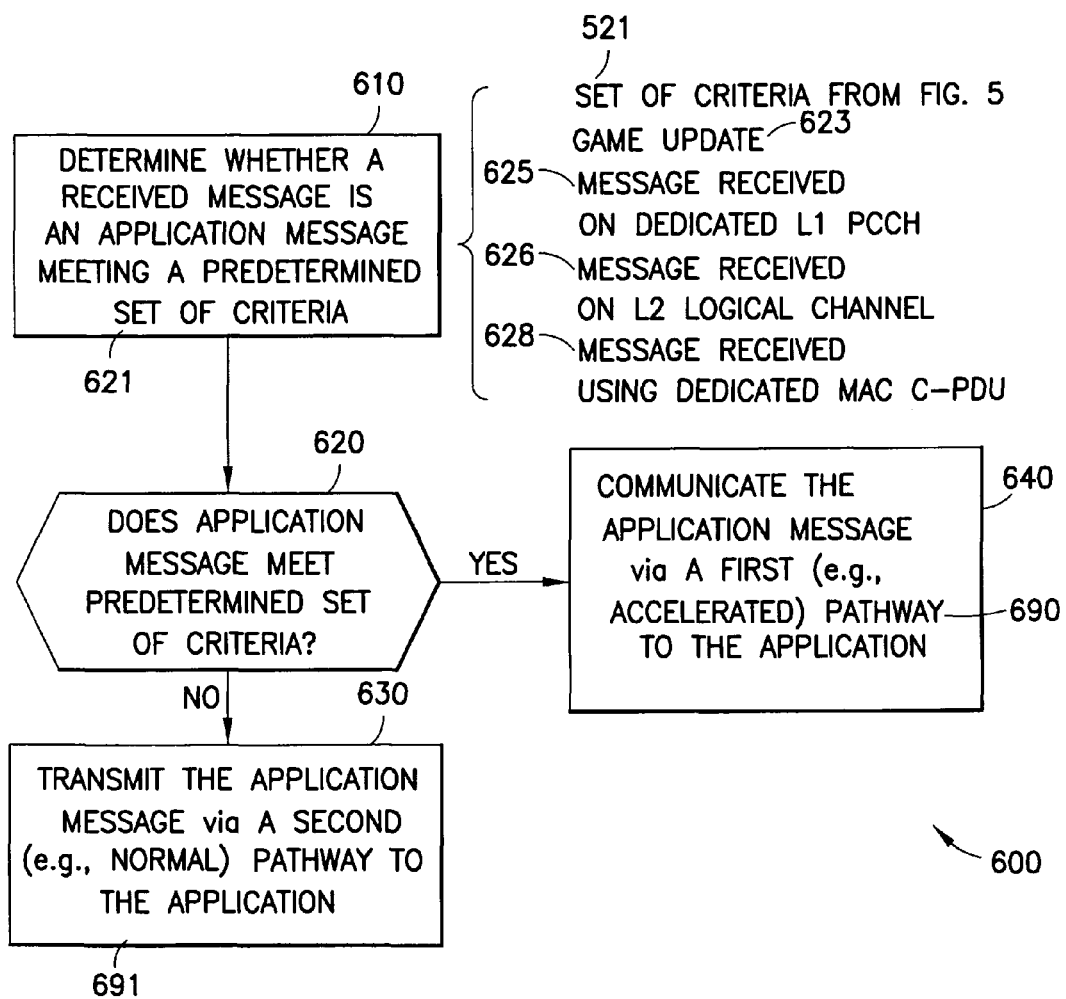
FIG. 6 is a block diagram of an exemplary flow chart used by a wireless communications device to receive information for real-time gaming and other applications to support D2D communications.

Turning now to FIG. 6, a block diagram is shown of an exemplary flow chart 600 used by a wireless communications device to receive information for real-time gaming and other applications to support D2D communications. Blocks in the block diagram may be performed, e.g., by a controller 10A executing program 10C in the UE 10 of FIG. 2, hardware elements in the UE such as a semiconductor circuit configured to perform the blocks, or some combination of these.

In block 610, it is determined whether a received message is an application message meeting a predetermined set 621 of criteria. The predetermined set 621 of criteria includes, e.g., the predetermined set 521 of criteria described above in reference to FIG. 5; a game update 623; a message 625 received on a dedicated L1 PCCH; a message 626 received on a dedicated L2 logical channel; and a message 628 received using a dedicated MAC C-PDU. That is, for messages 625, 626, and 628, because certain elements (e.g., L1 PCCH, L2 logical channel, MAC C-PDU) are dedicated to communication of selected application messages, then communication on those elements means that a selected application message meets a predetermined set 621 of criteria.

In block 620, it is determined if the application message meets the predetermined set 621 of criteria. If so (block 620=Yes), the application message is communicated via a first (e.g., accelerated) pathway 690 to the application. This occurs in block 640. If not (block 620=No), the application message is communicated via a second (e.g., normal) pathway 691 to the application. This occurs in block 630.

Exemplary embodiments have been described in broad terms. Now, more specific examples are described. In an aspect of the invention, the L1 physical control channel is used as an exemplary alternative to enable real-time gaming and other applications support for D2D communications. For instance, in an exemplary embodiment, devices (e.g., UEs 310-2 through 310-6) of the players are configured to send their individual user game commands in a predefined physical control channel which is allocated to the individual devices in accordance with the applied radio interface protocols for operating D2D communications between the devices.

Thus, in case LTE-A protocol structures are used as the basis for D2D communications as assumed above, then user gaming input in the set 522 may be sent on PDCCH or PUCCH configured to the individual devices, commonly referred to as PCCH.

Note that in a D2D connection between two devices for a simple example, one device may act as a master and the other as a slave in conducting the communication over the specified radio interface. The master may use its configured PCCH for scheduling and controlling transmission of the slave; and the slave may use its configured PCCH for sending feedback control such as CQI reporting and HARQ ACK/NACK to the master.

Figure 7:
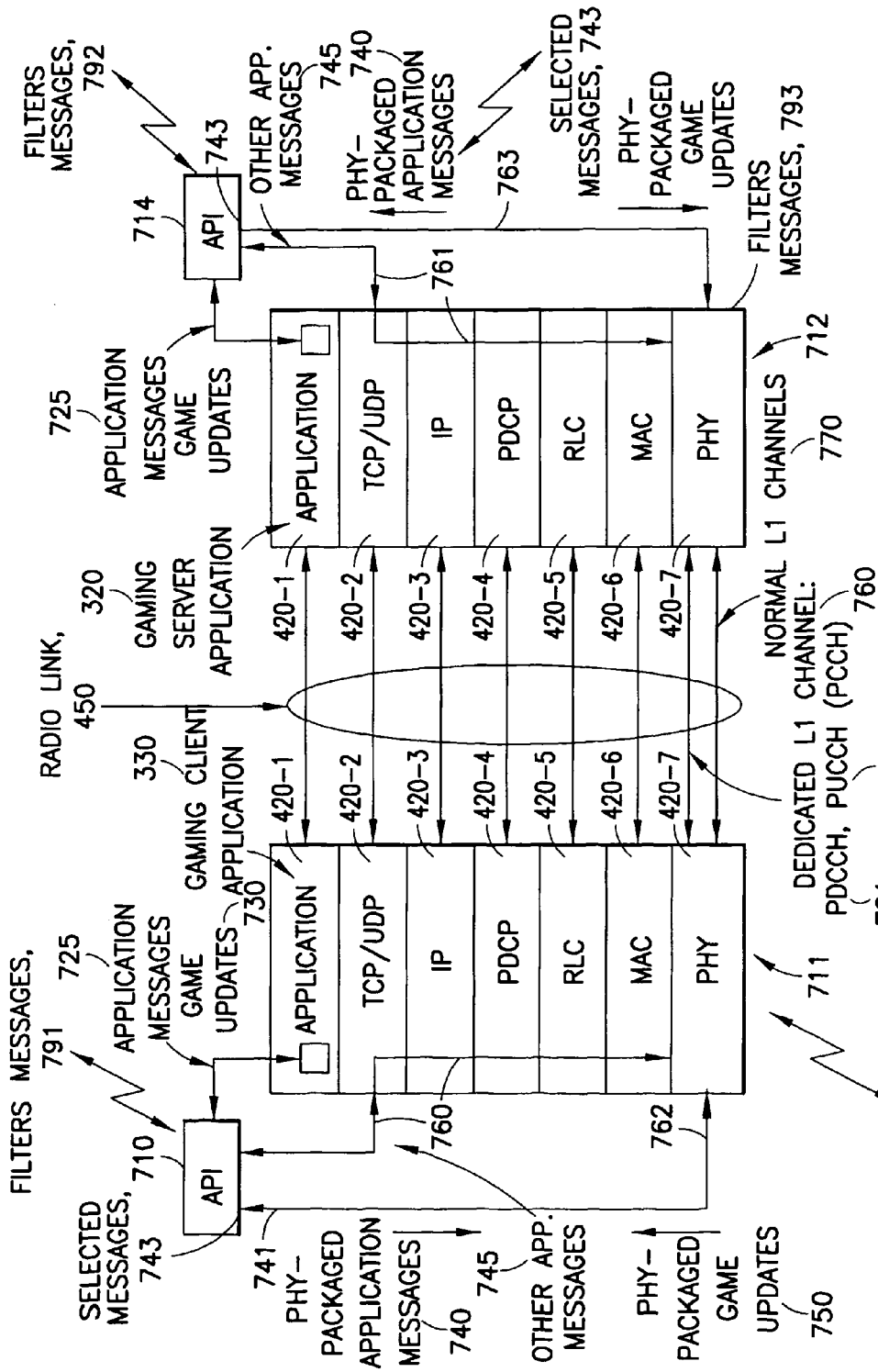
FIGS. 7-9 are block diagrams showing exemplary techniques for routing application messages for real-time gaming and other applications to support D2D communications.

There will be interactions between layers of the D2D protocol stacks including at least the application layer and the physical layer at the device side to feed the user game commands to the physical layer for transmission. In this regard, it is proposed, in one exemplary option, direct interaction between the application layer 420-1 and the physical layer 420-7 via, e.g., a suitable API 710. This is shown in FIG. 7. In this example, the UE 711 is a client UE and the UE 712 is a server UE. Application messages 725 (e.g., all application messages from an application) are examined by the application programmer interface (API) 710, which filters 791 the messages (see, e.g., blocks 510 and 520 of FIG. 5) such that selected application messages 743 that meet the predetermined set 521 of criteria are sent via pathway 590, which includes in this instance pathway 741, layer 420-7 in the UE 711, and the dedicated L1 channel 760. The selected messages 743 are communicated to the PHY later 420-7 as, e.g., PHY-packaged application messages 740. The other application messages 745 are sent via pathway 591, which includes pathway 760, layer 420-7 of the UE 711, and the normal L1 channel(s) 770. Thus, the UE 711 performs the transmitting of blocks 540 and 530 using the radio link 450.

At the server side, the UE 712 receives the selected messages 743 via the dedicated L1 channel 760 (e.g., PDCCH 781, PUCCH 782) and receives the other application messages 745 via normal L1 channels 770. The PHY layer 420-7 of the UE 712 filters 793 received messages (see, e.g., blocks 610 and 620 of FIG. 6) and sends the PHY packaged application messages 740 via a pathway 690, which includes pathway 763, which skips layers 420-2 through 420-6 and interacts with the API 714. The API 714 then communicates (see block 640 of FIG. 6) selected messages 743 to the application layer 420-1, which in this example includes a gaming server application 320. Other application messages 745 are communicated by the PHY layer 420-7 via the normal pathway 791, which includes pathway 761 in this example.

The gaming server application 320 collects a number of selected messages 743, e.g., from multiple UEs 711 in a cluster (e.g., cluster 300). The gaming server application 320 determines game updates 730 from the selected messages 743 and communicates these to the API 714, which performs filtering 792 to select the game updates and communicate them to the PHY layer 740-2 as, e.g. PHY-packaged game updates 750. Thus, the game updates 730 are sent via pathway 590, which includes pathway 763, PHY layer 420-7, and dedicated L1 channel 760 and transmitted to the UE 711 via the radio link 450. The other application messages 745 are sent via pathway 51, which includes pathway 761, layer 420-7 of the UE 712, and the normal L1 channel(s) 770. Thus, the UE 712 performs the transmitting of blocks 540 and 530.

The PHY layer 420-7 of UE 711 operates to receive game updates 730 via the dedicated L1 channel 760 and the other application messages 745 via the normal L1 channels 770, and operates to filter 794 the messages so that game updates 730 are communicated using, e.g., PHY-packaged game updates 750 via the accelerated pathway 690 (which includes pathway 762 in this example) to the API 710. The PHY layer 420-7 of the UE 711 also acts to filter 794 received messages by communicating other application messages 745 via the pathway 691, which includes pathway 760, to the API 710. The API 710 communicates the game updates 730 and the application messages 725 to the application layer 420-1 (e.g., the gaming client application 330).

It is noted that the APIs 710, 714, are arranged to perform any packaging or unpackaging of selected application messages 743 to and from PHY-packaged application messages 740. Similarly, the APIs 710, 714, are arranged to perform any packaging or unpackaging of game updates 730 to and from PHY-packaged game updates 750. It is also noted that the APIs 710, 714 may also communicate the selected messages 743 and game updates 730 to the corresponding PHY layer 420-7 without packaging this data. Furthermore, while FIG. 7 is directed to gaming applications 330, 320, other applications that produce messages meeting other predetermined sets 521 of criteria, such as the maximum packet size 526, predetermined packet priority 528, and/or a maximum delay 529 as shown in FIG. 5.

Figure 8:
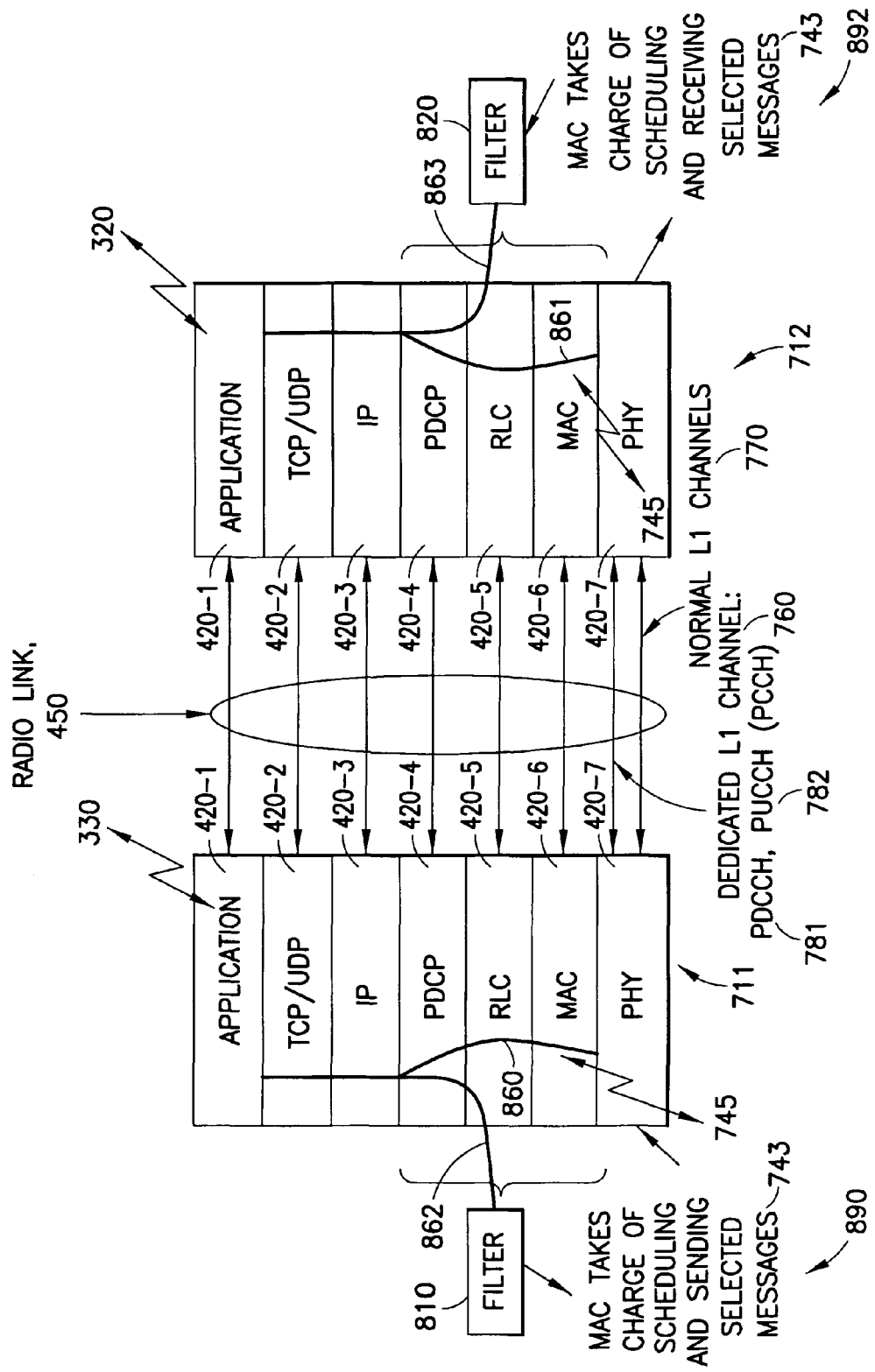

In another option, the L2 layer(s) (PDCP/RLC/MAC layers 420-4 through 420-6) filters out the user commands passed down from the application layer 420-1 and then the MAC layer 420-6 will take charge of scheduling and sending the selected user commands (e.g., meeting predetermined set of 521 of criteria) on the corresponding physical control channel. This option may be beneficial when projected onto a conventional LTE domain. This option is shown in FIG. 8, which shows the UEs 711 and 712 from FIG. 7. In this example, the filter 810 filters the application messages 725 to determine the selected messages 743 and send these via pathway 590, which includes pathway 862 and the MAC layer 420-6, which (in operation 890) takes charge of scheduling and sending selected messages 743 on the dedicated L1 channel 760. The filter 810 allows the other application messages 745 to proceed via the pathway 591, which includes pathway 860, the PHY layer 420-7, and the normal L1 channels 770. Note that how L2 layer(s) may filter out the user commands is proposed in detail below. Acceleration of selected messages 743 (relative to the transmission of the other application message 745) is due to the use of the more reliable and faster physical control channel (e.g., PDCCH 781, PUCCH 782) and not the physical shared channel (i.e., the normal L1 channel 770) as in normal communication. If one assumes the protocol stacks are based upon LTE, the normal shared channels include, e.g., a physical downlink shared channel (PDSCH) carrying the downlink shared transport channel (DL-SCH) and a physical uplink shared channel (PUSCH) carrying the uplink shared transport channel (UL-SCH). DL-SCH and UL-SCH, in turn, carry user traffic. For further details, see, e.g., 3GPP TS 36.300 or TS 36.211. Regarding operation 890, it might be more precise to say that MAC terminates transmission of a physical control channel rather than the MAC schedules transmission on the physical control channel, which is often pre-allocated, configured, and controlled by RRC. MAC is, however, in charge of scheduling transmissions on physical shared channels.

On the receiving side, the MAC layer 420-6 operates (operation 892), in conjunction with the PHY layer 420-7, to communicate preferentially the selected messages (e.g., using the filter 820) through pathway 690, which includes the pathway 863 to the application layer 420-1. The other application messages 745 are communicated via pathway 691, which includes pathway 861 in this example.

Although not shown in FIG. 8, game updates 730 may be filtered by the filter 820 so that the MAC layer 420-6 of the UE 712 takes charge of scheduling and sending the game updates 730 on the dedicated L1 channel 760. The pathway 590 would then include pathway 863, the filter 830, the MAC layer 420-6, the PHY layer 420-7, and the dedicated L1 channel 760. The filter 820 would then allow the other application messages 745 to proceed via the pathway 591, which includes pathway 861, the PHY layer 420-7, and the normal L1 channels 770.

The hosting device or the cluster head may receive PCCH instances from the devices of more than one other players at preconfigured occasions in time (e.g., system frame or sub-frame or slot) and frequency-code-space domains as allocated, and collect all the user commands (e.g., game commands) sent on those channels. In case the game server is a network server, then the cluster head will communicate with the network server to forward user game commands including its own and get server game update (e.g., position vector) from the server. In case the game server is the cluster head itself, then the cluster head may generate server game updates based upon collected user game commands. The cluster head then distributes the server game update to, e.g., all the players either on a designated PCCH or on a designated L2 logical channel mapped on physical shared channel (PSCH). In this regard, all other devices need to monitor only one PCCH or L2 logical channel instance of the hosting device.

Implicit or explicit L1/L2 multiplexing of multi-player commands may be applied, e.g., by using either implicit bit-position mapping (in which user command bits of the players are sent in a specified order according to configured position of the player in the group or cluster) or some explicit user identification (ID) may be used.

In another aspect of the invention, a designated L2 logical channel is used with possible multi-user data multiplexing as a pathway 590. For instance, the devices used by players are configured to send their individual user game commands to the cluster head in a designated L2 logical channel of which a common logical channel ID may be used across all the devices of the players (not to prevent or exclude the option that the logical channel ID is assigned on an individual user-device basis).

Figure 9:
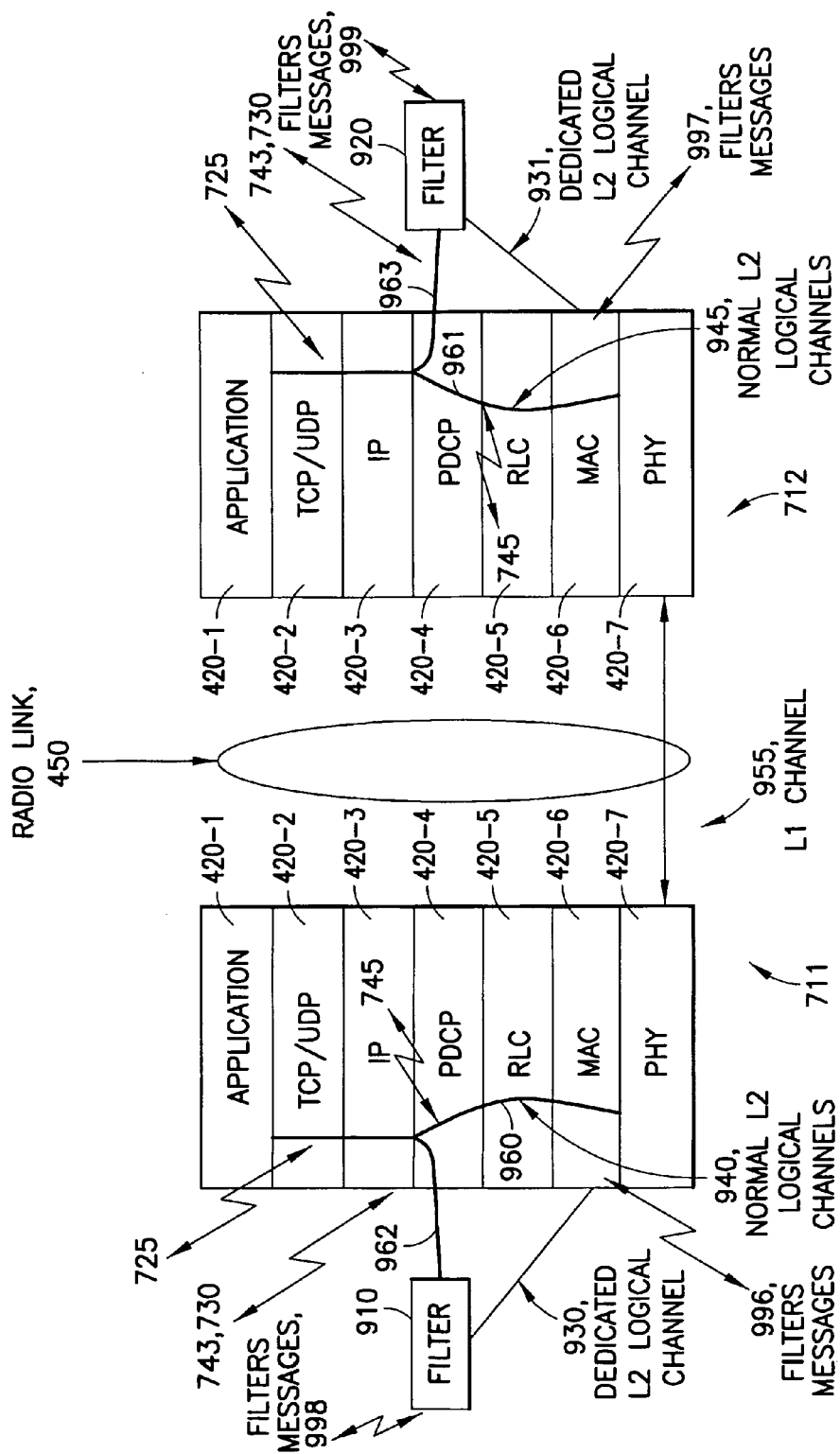

The cross-layer optimization may be applied using, e.g., a packet filter at a higher layer (PDCP or above) to filter out the user command packets (e.g., application messages 725) which have a particular small fixed size (and high priority or other marking properties applied) and then pass them down to MAC for a faster transmission, as configured beforehand. This is shown in FIG. 9, where a filter 910 operates in the PDCP layer 420-4 (for example) to filter (operation 998) application messages 725 to communicate selected messages 743 through an accelerated pathway 590, including the pathway 962, dedicated L2 logical channel 930, MAC layer 742-6, PHY layer 420-7, and the L1 channels 955. The filter 910 also filters (operation 998) application messages 725 to communicate other application messages 745 through a normal pathway 591, including the pathway 960, normal L2 logical channels 940, MAC layer 422-6, PHY layer 420-7, and the L1 channels 955.

On the receiving side, the MAC layer 420-6 of the UE 712 operates to filter 997 received messages and communicate the selected message 743 via the filter 920 to the upper layers (e.g., PDCP layer 420-4 or above). Thus, an accelerated pathway 690 includes the MAC layer 420-6 and its dedicated L2 logical channels 931, the filter 920, and the pathway 963. The other application messages 745 are communicated by the MAC layer 420-6 (e.g., as part of filtering 997) via the normal pathway 691, which includes pathway 961. It is noted that both the messages 743, 745 travel through the layers above the filter 920 via the same pathway.

It is noted that the filter 920 may filter messages (operation 999) by sending game updates 730 via the accelerated pathway 590 of the dedicated L2 logical channel 931 and the MAC layer 420-6. The filter 920 would filter (operation 999) the application messages 725 by causing the other application messages 745 to pass through the normal pathway 591, which includes pathway 745 (through the layers 520-4 through 420-6 and the normal L2 logical channels 945), the PHY layer 420-7, and the L1 channels 955. On the receiving end (UE 711), the MAC layer 420-6 filters (operation 996) received messages by communicating game updates 730 received via the dedicated L2 logical channel 930 to the filter 910 via accelerated pathway 690, which includes pathway 962 and communicating other application messages 745 received via the normal L2 logical channels 940 via normal pathway 691, which includes pathway 960.

The hosting device or the cluster head may receive multiple instances of the above-proposed dedicated logical channel 930, 931 from devices of more than one other player at pre-configured occasions in time (e.g., system frame or sub-frame or slot) and frequency-code-space domains, collect all the user game commands sent on those channels, communicate this information with the game server and then distribute the server game update to all the players on the dedicated logical channel 930, 931, similarly to that described above in reference to FIGS. 7 and 8. In this regard, suitable data multiplexing may be applied and all other devices may need to monitor only certain logical channel of the hosting device.

Figure 10A:
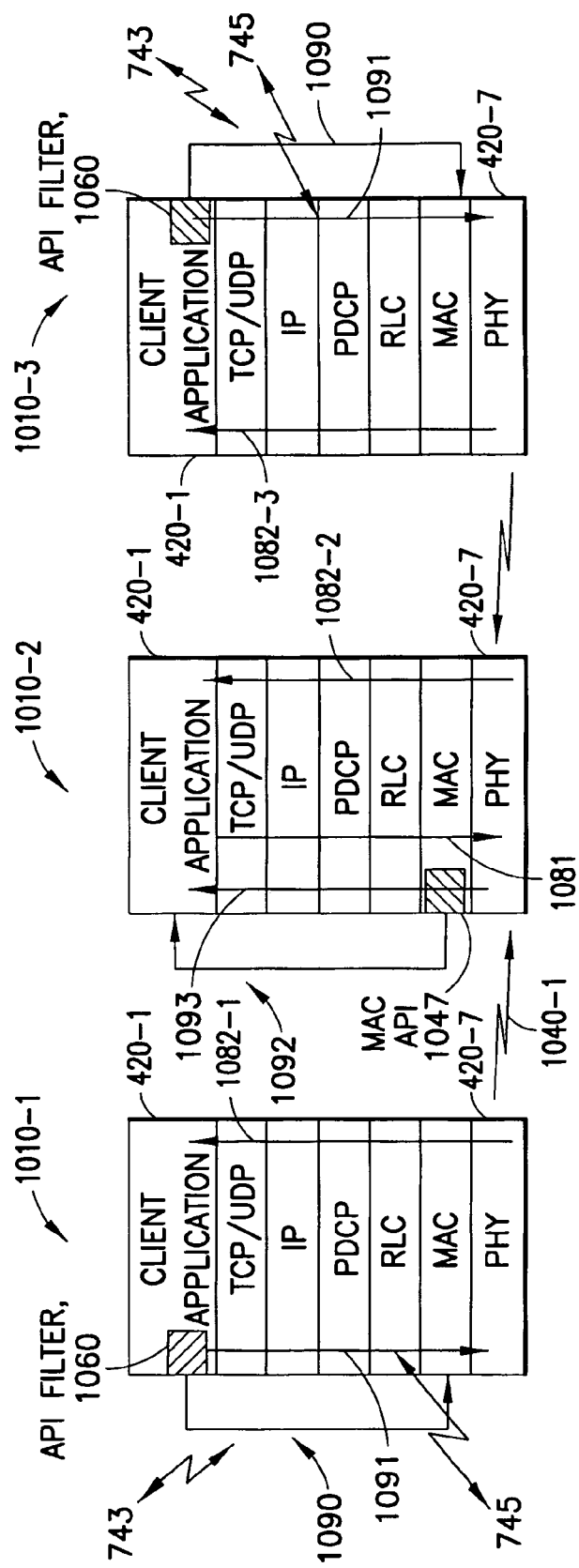
FIG. 10, including FIGS. 10A and 10B, includes diagrams of a cluster of UEs communicating for a real-time gaming application, where a server performs game updates through a radio network in radio communication with the cluster.
Figure 10B:
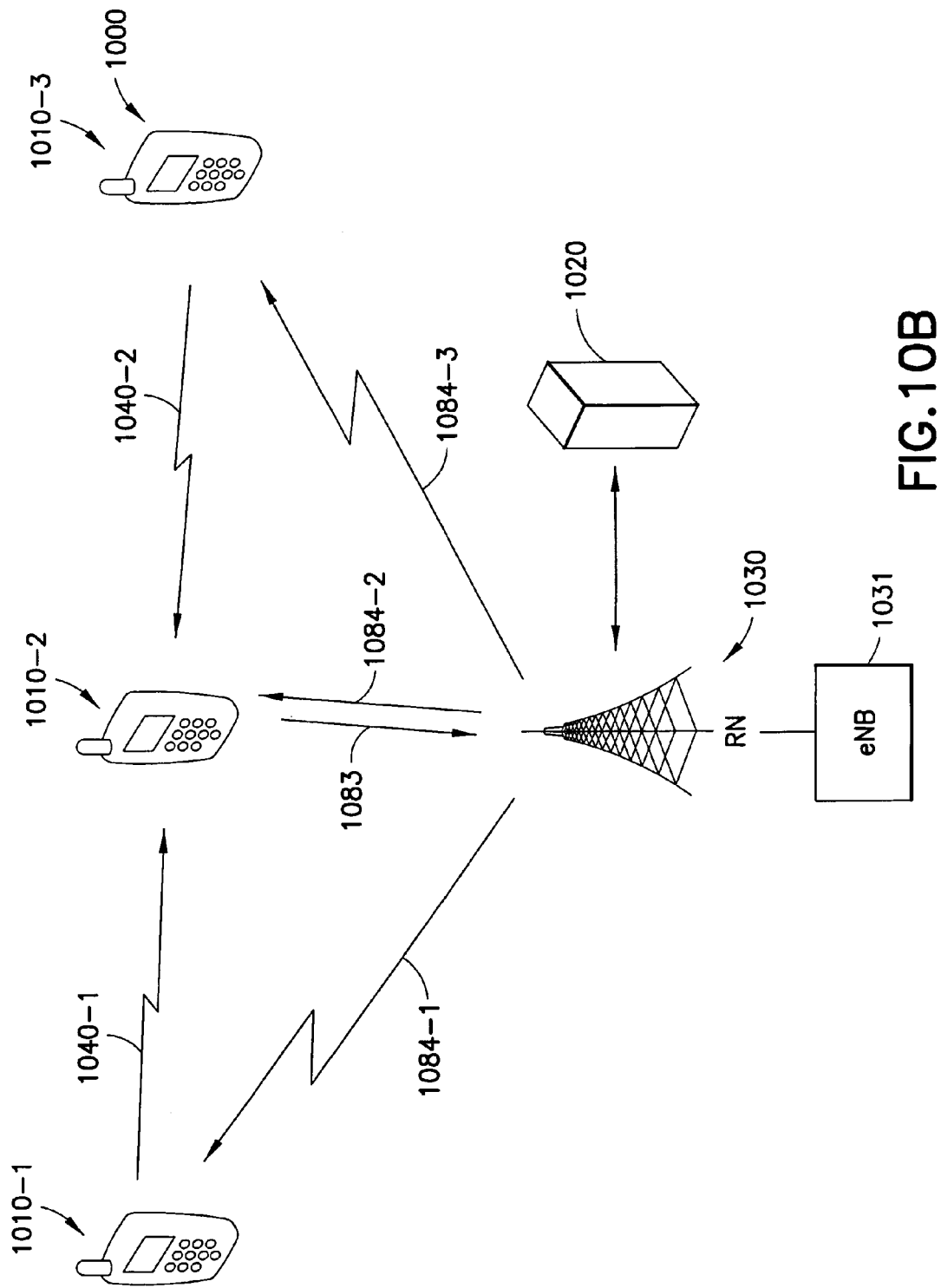

Furthermore, this invention also considers a possibility of multi-player gaming between mobile devices which involves both the cellular access network (a serving eNB) for, e.g., controlling and managing D2D connectivity, resource allocation and mobility, including providing access to the network gaming server, and direct D2D communications between the devices for, e.g., local connectivity, transmitting and distributing application contents including user game commands or server game updates or even video streaming. An example of this is shown in FIG. 10, including FIGS. 10A and 10B, which includes diagrams of a cluster 1000 of UEs 1010-1, 1010-2, and 1010-3 communicating for a real-time gaming application (e.g., client application as part of application layer 420-1), where a server 1020 performs game updates through a radio network 1030 in radio communication with the cluster 1000. In this example, keyboard input from clients 1010-1, 1010-3 (e.g., set 523 of keystrokes) is passed (e.g., as selected messages 743) through selective API filter 1060 to the MAC layer 420-6 via the pathway 1090 (e.g., as part of pathway 590). The API filter 1060 passes the other application messages 745 through the pathway 1091 (e.g., as part of pathway 591). The keyboard input is communicated via radio links 1040-1, 1040-2.

The UE application ("client application") in the UE 1010-2 aggregates the keyboard input from the clients 1010-1, 1010-

3, possibly with a catch at MAC API 1047 (e.g., the MAC API 1047 communicates the keyboard input via an accelerated pathway 690 including the pathway 1092, while communicating the other application messages 745 via the normal pathway 691 including pathway 1093). The UE application in the UE 1010-2 forwards the keyboard input to the server 1020 via the radio network 1030 and the eNB 1031. This is illustrated by pathway 1081 (FIG. 10A) and communication 1083 (FIG. 10B). Distribution of the game updates 730 occurs directly over cellular, via the cellular communications 1084-1 through 1084-3 (corresponding to pathways 1082-1 through 1082-3, respectively; note that these communications are not D2D communications).

Figure 11A:
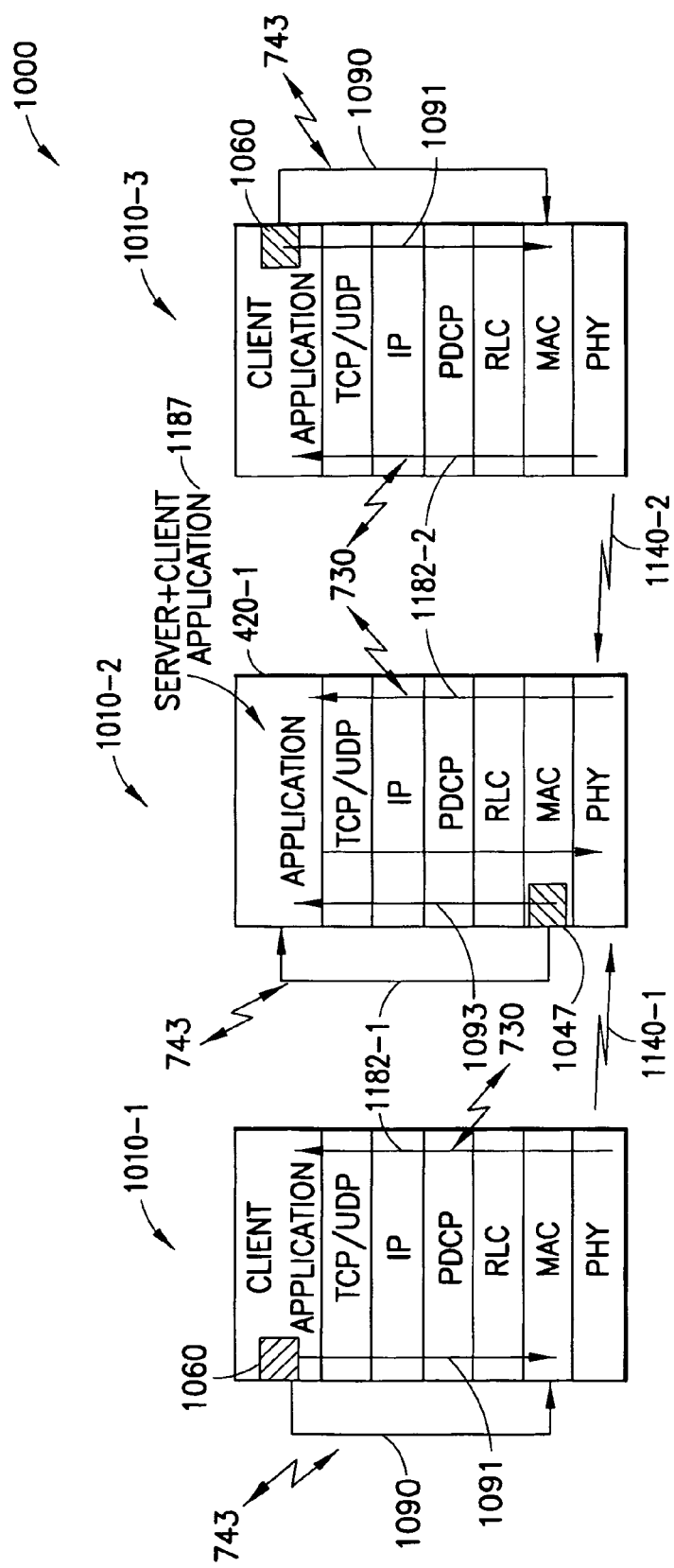
FIG. 11, including FIGS. 11A and 11B, includes block diagrams of a cluster of UEs communicating for a real-time gaming application, where one of the UEs is both cluster head and game server that performs game updates.
Figure 11B:
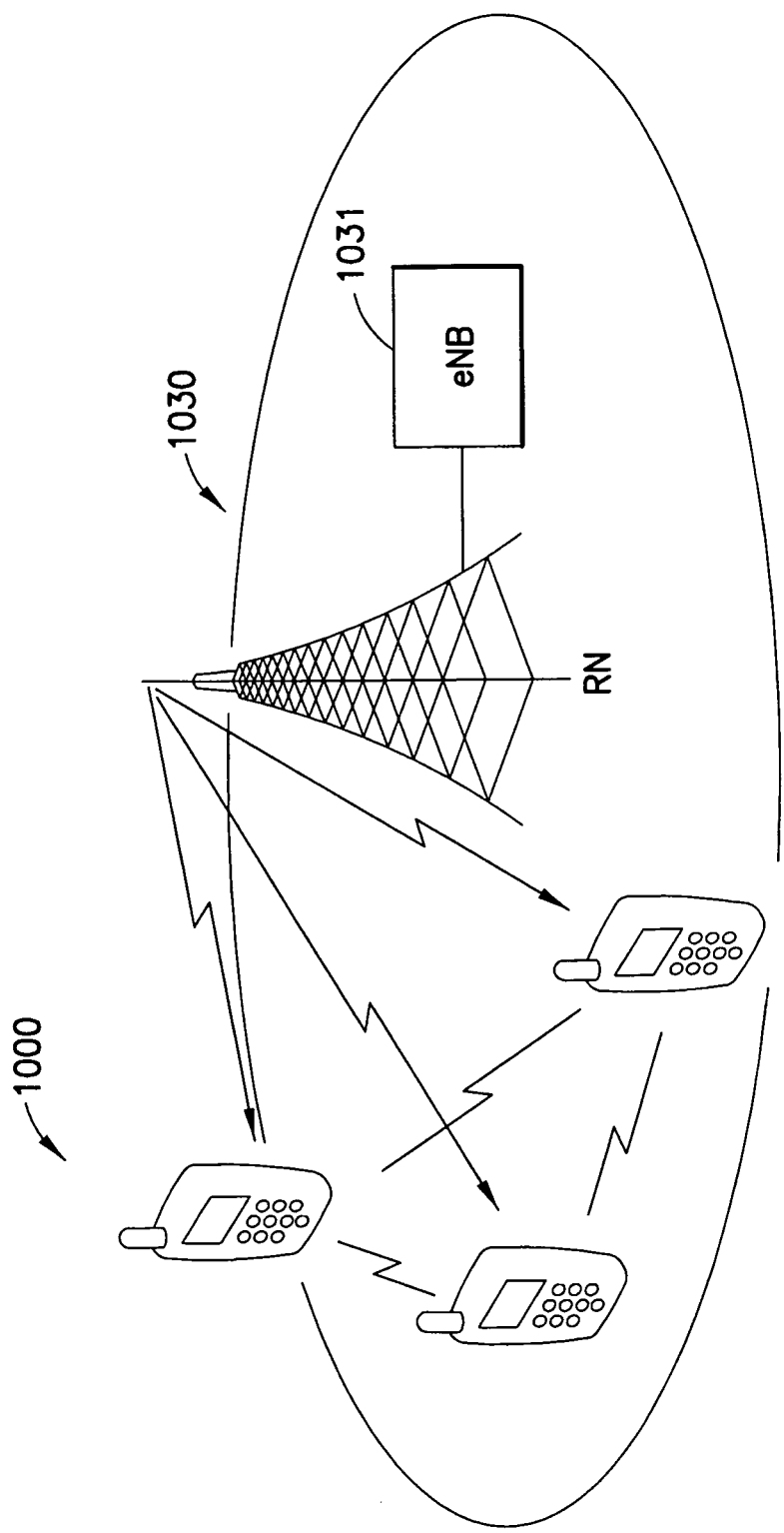

FIG. 11, including FIGS. 11A and 11B, includes diagrams of a cluster 1000 of UEs communicating for a real-time gaming application, where one of the UEs (1010-2) is both cluster head and game server that performs game updates. In this example, keyboard input passed through a selective filter 1060 to the MAC layer 420-7, as in FIG. 10, and is carried via the accelerated pathway 1090 and the radio links 1140-1, 1140-2. In the UE 1010-2, there is a catch at MAC API 1047 of the selected message 743, but the application in layer 420-1 of the UE 1010-1 is both a client application and server application 1187. Thus, the UE 1010-2 acts as a game server and performs distribution of game updates 730 back through this UE using D2D communications through full stack (i.e., via pathway 1182-2), if a large game-update or a non-critical update occurs. This means that the radio link 1140-1, 1140-2 is used and the UEs 1010-1, 1010-3 also pass the game updates 730 through the full stack (i.e., via respective pathways 1182-1, 1182-3). As another example, the game updates 730 may also be passed through a selective API filter (e.g., can be multiplexed in a fixed structure) such as an API filter 1060 and a corresponding filter 1047 in each UE 1010-1, 1010-3.

As another example, as a central serving eNB 1031 is involved, another alternative to the above options for collecting and transmitting user game commands and server game updates among the D2D devices is to utilize the serving eNB 1031 to relay and distribute the game commands and server game updates for the devices for the players. In this alternative, the devices 1010 may be configured to send their individual user game commands on configured PUCCH instances or logical channels to the eNB 1031, and then the eNB 1031 receives and sends the collected gaming commands to the network gaming server over the interne or to the cluster head (e.g., 1010-2) acting as the server on PDCCH or corresponding logical channel, similarly to the analogy described above. The eNB may also distribute server gaming updates (e.g., position vectors) to the devices of the players (e.g., 1010-1, 1010-3) on request of the cluster head (e.g., 1010-2). This requires certain additions or enhancements to e.g. E-UTRAN, PUCCH and PDCCH transmissions and MAC in particular.

One further alternative is to distribute user game commands using a new designated MAC control protocol data unit (C-PDU). See, e.g. MAC C-PDU 544 of FIG. 5. In this option, user game commands are filtered out and passed to MAC, and then MAC will send them in form of a MAC C-PDU.

In a regular operation, all MAC service data units (control-plane or user-plane data passed down from an upper layer) are sent by MAC in some specifically configured logical channel in form of regular MAC data-type PDU (called a data-PDU herein). In this regard, all application layer data including game commands in regular operation are sent in a logical channel. The logical channel ID will be included in the header of regular MAC data-type PDUs as a control field.

Then, the MAC has different kinds of control-type PDUs (called C-PDUs herein) which may have different formats and each may be used for a certain control purpose. In regular operation, MAC C-PDUs are generated and terminated by MAC. MAC C-PDUs are often treated with highest priority. MAC C-PDUs can be multiplexed with other data PDUs of different logical channels and sent in the same transport block of the physical layer. Thus, there is no need to configure a specific logical channel to send MAC C-PDU and in this regard MAC C-PDU is not sent in the same logical channel of any other data PDUs.

In an exemplary embodiment of the instant proposal, as game commands are to be sent in form of new MAC C-PDU for highest priority treatment, the regular operation needs to be modified a bit. Game commands need to be received and put into MAC C-PDU at the MAC layer. For this operation, at the device side, the application layer may pass down game commands to MAC via, e.g., an internal API bypassing all protocol layers in between the application and the MAC.

Note that advanced gaming applications may tolerate latencies of up to 100 ms (milliseconds). In some popular but older and simpler networked racing games such as Turbo Sliders or Easy Sliders latencies may be between 80 ms-200 ms and configurable as system parameters up for setting at the beginning of the game. Therefore, even though the method and mechanism proposed above may ensure all the user game commands are distributed among the players within a system frame of 10 ms as of LTE E-UTRAN assumed, the actual schedules of sending and receiving the aforementioned physical control channels carrying game commands may be configured and adapted to the maximum tolerable game-event-updating latency (for sampling, synchronizing and handling gaming events and the user game commands on the application level). This latency may be a set parameter of the game but may be a dynamic, monitored parameter depending on, e.g., available bandwidth or allocated resources, connection statuses and channel conditions (affecting throughput-delay and user-perceived QoS characteristics of the gaming application). Thus, it may be sufficient and efficient to coordinate and schedule the distribution of user game commands within several system frames in a semi-static but adaptive fashion. This adaptation and configuration thereof including necessary interactions and control signaling between different protocol layers 420 and between the controlling node (the hosting device or the serving cellular system via eNB) may be considered as another embodiment of this invention.

Regarding signaling, it should be noted that although the D2D communication occurs between UEs, a base station typically schedules the D2D communication and therefore also may perform signaling to effect the scheduling. The base station may signal indications of any of the accelerated pathways 541-544 and/or the normal pathways 581-584.

Figure 12:
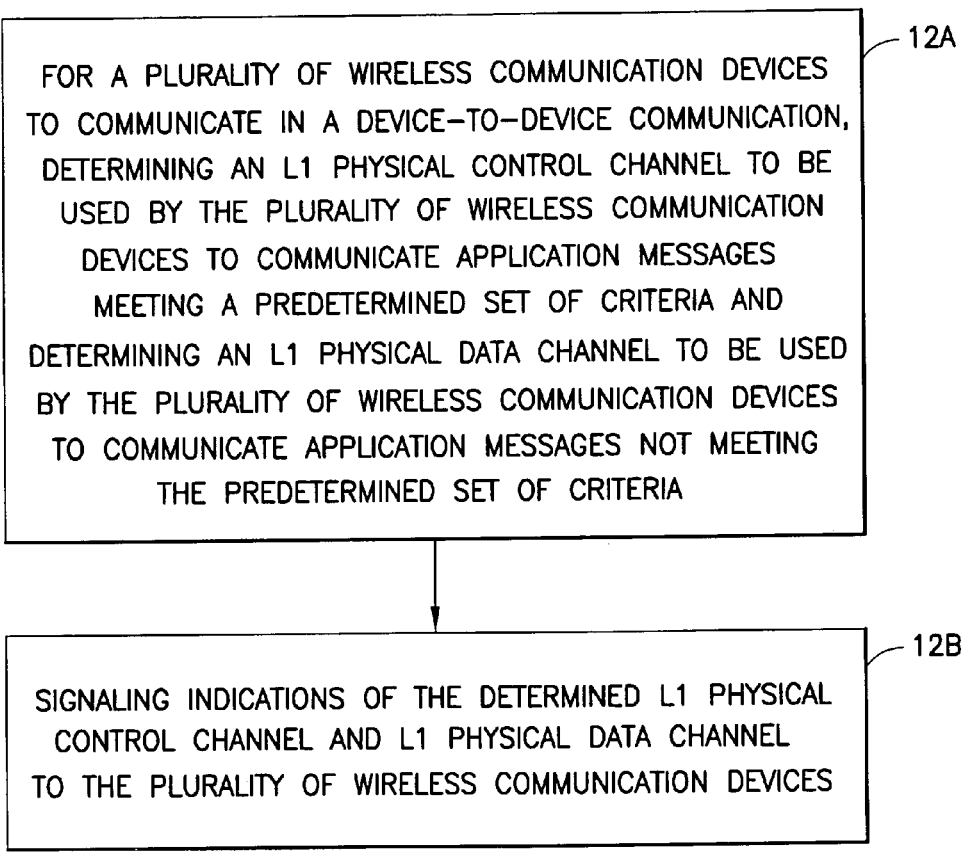
FIGS. 12 and 13 are block diagrams of an exemplary flowchart used by a base station.
Figure 13:
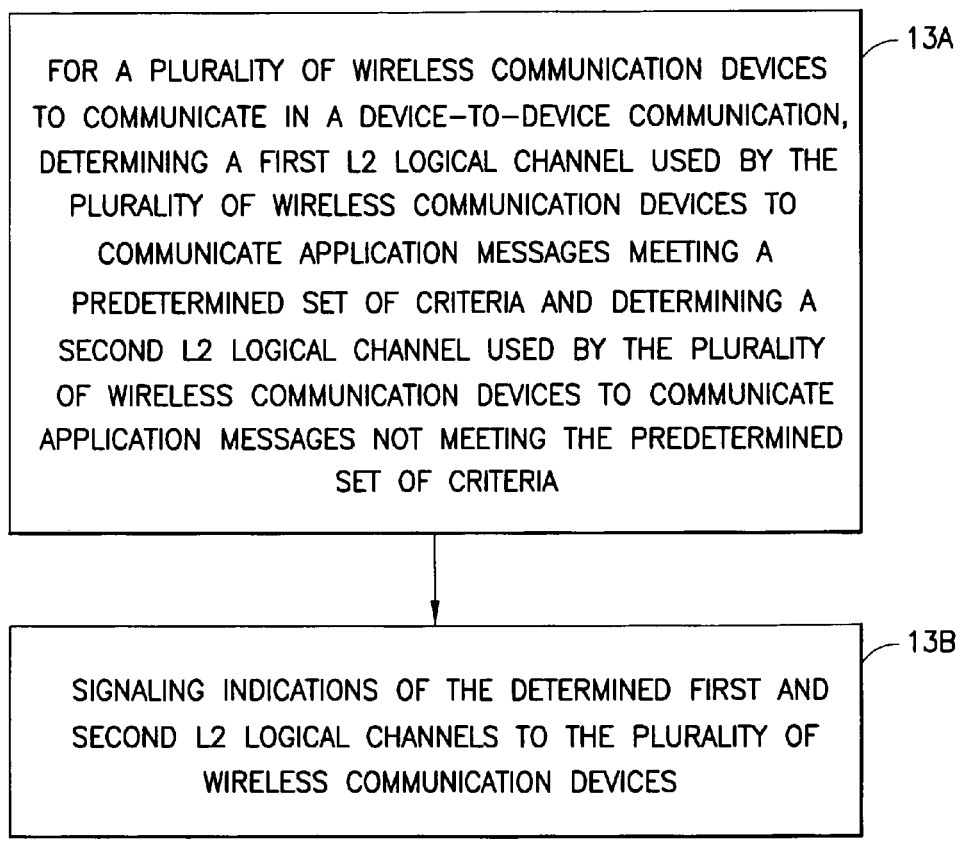

For instance, in FIGS. 12 and 13, flowcharts of exemplary methods performed by a base station are shown. In the example of FIG. 12, in block 12A, for the wireless communication devices to communicate in a device-to-device communication, the base station determines an L1 physical control channel to be used by the wireless communication devices to communicate application messages meeting a predetermined set of criteria and determines an L1 physical data channel to be used by the wireless communication devices to communicate application messages not meeting the predetermined set of criteria. In block 12B, the base station signals indications of the determined L1 physical control channel and L1 physical data channel to the wireless communication devices.

FIG. 13 is another example. In block 13A, for the wireless communication devices to communicate in a device-to-device communication, the base station determines a first L2 logical channel used by the wireless communication devices to communicate application messages meeting a predetermined set of criteria and determines a second L2 logical channel used by the wireless communication devices to communicate application messages not meeting the predetermined set of criteria. In block 13B, the base station signals indications of the determined first and second L2 logical channels to the wireless communication devices.

Without in any way limiting the scope, interpretation, or application of the claims appearing below, a technical effect of one or more of the example embodiments disclosed herein is to enable real-time applications such as games to communicate via D2D communications. Another technical effect of one or more of the example embodiments disclosed herein is to preferentially treat selected user input to speed processing of that input relative to other user input.

In an exemplary embodiment, a computer program product is disclosed that comprises a computer-readable medium bearing computer program code embodied therein for use with a computer, the computer program code comprising: code for, in a wireless communications device, determining whether an application message meets a predetermined set of criteria; code for in response to the application message meeting the predetermined set of criteria, transmitting the application message via a first pathway between the wireless communications device and at least one other wireless communications device participating in a device-to-device communication with the wireless communications device; and code for in response to the application message not meeting the predetermined set of criteria, transmitting the application message via a second pathway between the wireless communications device and the at least one other wireless communications device participating in the device-to-device communication with the wireless communications device, wherein the second pathway is different from the first pathway.

In another exemplary embodiment, an apparatus is disclosed that includes means, in a wireless communications device, for determining whether an application message meets a predetermined set of criteria; means, responsive to the application message meeting the predetermined set of criteria, for transmitting the application message via a first pathway between the wireless communications device and at least one other wireless communications device participating in a device-to-device communication with the wireless communications device; and means, responsive to the application message not meeting the predetermined set of criteria, for transmitting the application message via a second pathway between the wireless communications device and the at least one other wireless communications device participating in the device-to-device communication with the wireless communications device, wherein the second pathway is different from the first pathway.

In an additional exemplary embodiment, a method is disclosed that includes determining at a first wireless communications device whether a received application message meets a predetermined of criteria, the received message received from at least one other wireless communications device via a device-to-device communication with the first wireless communications device; in response to the received application message meeting the predetermined set of criteria, communicating the received application message via a first pathway internal to the first wireless communications device to an application being executed by the first wireless communications device; and in response to the received application message not meeting the predetermined set of criteria, transmitting the received application message via a second pathway internal to the first wireless communications device to an application being executed by the first wireless communications device, wherein the second pathway is different from the first pathway.

In a further exemplary embodiment, a computer program product is disclosed that comprises a computer-readable medium bearing computer program code embodied therein for use with a computer, the computer program code comprising: code for determining at a first wireless communications device whether a received application message meets a predetermined of criteria, the received message received from at least one other wireless communications device via a device-to-device communication with the first wireless communications device; code for, in response to the received application message meeting the predetermined set of criteria, communicating the received application message via a first pathway internal to the first wireless communications device to an application being executed by the first wireless communications device; and code for, in response to the received application message not meeting the predetermined set of criteria, transmitting the received application message via a second pathway internal to the first wireless communications device to an application being executed by the first wireless communications device, wherein the second pathway is different from the first pathway.

In an additional exemplary embodiment, an apparatus is disclosed that includes means for determining whether a received application message meets a predetermined of criteria, the received message received from at least one other apparatus via a device-to-device communication with the apparatus; means, responsive to the received application message meeting the predetermined set of criteria, for communicating the received application message via a first pathway internal to the apparatus to an application being executed by the apparatus; and means, responsive to the received application message not meeting the predetermined set of criteria, for transmitting the received application message via a second pathway internal to the apparatus to an application being executed by the apparatus, wherein the second pathway is different from the first pathway.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable memory medium that may be any media or means that can retain the instructions for use by or in connection with an instruction execution system, apparatus, or device, such as a computer. The computer-readable medium may be a non-transitory medium, said medium not including carrier waves but including computer-readable memory media.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
a transceiver for bidirectional wireless communications;
at least one processor; and
at least one memory including computer program code,
the at least one memory and the computer program code configured to, with the at least one processor and in response to execution of the computer program code, cause the apparatus to perform at least the following:
determining whether an application message from an application meets a predetermined set of criteria;
in response to the application message meeting the predetermined set of criteria, transmitting the application message via a first communication layer pathway from the application to an L1 physical control channel used to communicate in a wireless device-to-device communication with at least one other apparatus; and
in response to the application message not meeting the predetermined set of criteria, transmitting the application message via a second communication layer pathway from the application to an L1 physical data channel used to communicate in the wireless device-to-device communication with the at least one other apparatus.

2. The apparatus of claim 1, wherein the L1 physical control channel is one of a physical downlink control channel or a physical uplink control channel and the L1 physical data channel is one of a physical downlink shared channel, or a physical multicast channel, or a physical uplink shared channel.

3. The apparatus of claim 1, wherein the determining, transmitting the application message via a first communication layer pathway, and transmitting the application message via a second communication layer pathway, are performed for each application message produced by a selected application.

4. The apparatus of claim 3, wherein the selected application is a gaming application and wherein the predetermined set of criteria comprises whether or not the application message meets a predetermined set of user input for the gaming application.

5. The apparatus of claim 4, wherein the set of user input corresponds to a set of keystrokes, the set of keystrokes being less than all possible keystrokes.

6. The apparatus of claim 1, wherein the predetermined set of criteria corresponds to at least one game update.

7. The apparatus of claim 1, wherein the predetermined set of criteria comprises a predetermined packet size.

8. The apparatus of claim 7, wherein the predetermined set of criteria further comprises predetermined packet priority and a maximum delay.

9. The apparatus of claim 1, wherein the first communication layer pathway comprises a first number of communication layers, the second communication layer pathway comprises a second number of communication layers, and the first number of communication layers is less than the second number of communication layers.

10. An apparatus, comprising
a transceiver for bidirectional wireless communications;
at least one processor; and
at least one memory including computer program code,
the at least one memory and the computer program code configured to, with the at least one processor and in response to execution of the computer program code, cause the apparatus to perform at least the following:
determining whether an application message from an application meets a predetermined set of criteria;
in response to the application message meeting the predetermined set of criteria, transmitting the application message via a first communication layer pathway from the application to a first L2 logical channel used to communicate in a wireless device-to-device communication with at least one other apparatus; and
in response to the application message not meeting the predetermined set of criteria, transmitting the application message via a second communication layer pathway from the application to a second L2 logical channel used to communicate in the wireless device-to-device communication with the at least one other apparatus.

11. The apparatus of claim 10, wherein:
the first L2 logical channel is mapped to a first radio bearer carrying control-plane service flows and the first radio bearer is used to communicate in the wireless device-to-device communication with the at least one other apparatus; and
the second L2 logical channel is mapped to a second radio bearer carrying user-plane service flows and the second radio bearer is used to communicate in the wireless device-to-device communication with the at least one other apparatus.

12. The apparatus of claim 10, wherein:
the first L2 logical channel is configured to have a unique logical channel identifier common to all apparatuses involved in the wireless device-to-device communication.

13. The apparatus of claim 10, wherein the first communication layer pathway comprises a first number of communication layers, the second communication layer pathway comprises a second number of communication layers, and the first number of communication layers is less than the second number of communication layers.

14. The apparatus of claim 10, wherein:
the first communication layer pathway comprises a first number of communication layers, the second communication layer pathway comprises a second number of communication layers, and the first number of communication layers is less than the second number of communication layers;
transmitting, in response to the application message meeting the predetermined set of criteria, further comprises transmitting the application message in a control protocol data unit configured to contain the application message and used on the first L2 logical channel; and
transmitting, in response to the application message not meeting the predetermined set of criteria, further comprises transmitting the application message in a data protocol data unit configured to contain the application message and used on the second L2 logical channel.

15. An apparatus, comprising:
a transceiver for bidirectional wireless communications;
at least one processor; and
at least one memory including computer program code, the at least one memory and the computer program code configured to, with the at least one processor and in response to execution of the computer program code, cause the apparatus to perform at least the following:

for a plurality of wireless communication devices to communicate in a device-to-device communication, determining an L1 physical control channel to be used by the plurality of wireless communication devices to communicate application messages meeting a predetermined set of criteria and determining an L1 physical data channel to be used by the plurality of wireless communication devices to communicate application messages not meeting the predetermined set of criteria; and signaling, using the transceiver, indications of the determined L1 physical control channel and L1 physical data channel to the plurality of wireless communication devices.

16. The apparatus of claim 15, wherein the L1 physical control channel is one of a physical downlink control channel or a physical uplink control channel and the L1 physical data channel is one of a physical downlink shared channel, or a physical multicast channel, or a physical uplink shared channel.

17. An apparatus, comprising:
a transceiver for bidirectional wireless communications;
at least one processor; and
at least one memory including computer program code,
the at least one memory and the computer program code configured to, with the at least one processor and in response to execution of the computer program code, cause the apparatus to perform at least the following:
for a plurality of wireless communication devices to communicate in a device-to-device communication, determining a first L2 logical channel used by the plurality of wireless communication devices to communicate application messages meeting a predetermined set of criteria and determining a second L2 logical channel used by the plurality of wireless communication devices to communicate application messages not meeting the predetermined set of criteria; and signaling, using the transceiver, indications of the determined first and second L2 logical channels to the plurality of wireless communication devices.

18. The apparatus of claim 17, wherein:
the first L2 logical channel is mapped to a first radio bearer carrying control-plane service flows and the first radio bearer is to be used by the plurality of wireless communication devices to communicate in the wireless device-to-device communication;
the second L2 logical channel is mapped to a second radio bearer carrying user-plane service flows and the second radio bearer is used by the plurality of wireless communication devices to communicate in the wireless device-to-device communication; and
signaling further comprises signaling indications of the first and second radio bearers to the plurality of wireless communication devices.

19. The apparatus of claim 17, wherein:
the first L2 logical channel is configured to have a unique logical channel identifier common to all the plurality of wireless communication devices to communicate in the wireless device-to-device communication.

\* \* \* \* \*